United States Patent
Tatsuno et al.

(10) Patent No.: US 8,441,512 B2
(45) Date of Patent: May 14, 2013

(54) OPTICAL SCANNER AND IMAGE FORMING APPARATUS ADDRESSING UNEVEN BIREFRINGENCE DISTRIBUTION OF A SCANNING LENS

(75) Inventors: Hibiki Tatsuno, Kanagawa (JP); Daisuke Ichii, Kanagawa (JP); Nobuyuki Arai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 50 days.

(21) Appl. No.: 13/042,935

(22) Filed: Mar. 8, 2011

(65) Prior Publication Data
US 2011/0221857 A1 Sep. 15, 2011

(30) Foreign Application Priority Data
Mar. 12, 2010 (JP) ................................. 2010-055509

(51) Int. Cl.
*B41J 15/14* (2006.01)
*B41J 27/00* (2006.01)

(52) U.S. Cl.
USPC .......................................... 347/241; 347/256

(58) Field of Classification Search .................. 347/230, 347/241–244, 256–261
See application file for complete search history.

(56) References Cited

U.S. PATENT DOCUMENTS

| | | | |
|---|---|---|---|
| 6,856,439 B2 * | 2/2005 | Inagaki ....................... 359/204.1 |
| 6,924,938 B2 | 8/2005 | Nishina et al. |
| 7,218,432 B2 | 5/2007 | Ichii et al. |
| 7,417,777 B2 | 8/2008 | Saisho et al. |
| 7,443,558 B2 | 10/2008 | Sakai et al. |
| 7,545,547 B2 | 6/2009 | Hayashi et al. |
| 7,586,661 B2 | 9/2009 | Ichii |
| 7,623,280 B2 | 11/2009 | Hirakawa et al. |
| 7,626,744 B2 | 12/2009 | Arai et al. |
| 7,663,657 B2 | 2/2010 | Ichii et al. |
| 7,672,032 B2 | 3/2010 | Hayashi et al. |
| 7,687,762 B2 | 3/2010 | Watanabe et al. |
| 7,738,007 B2 | 6/2010 | Ichii et al. |
| 7,800,805 B2 | 9/2010 | Hayashi et al. |
| 2003/0179429 A1 | 9/2003 | Takanashi et al. |
| 2007/0211325 A1 | 9/2007 | Ichii |

(Continued)

FOREIGN PATENT DOCUMENTS

| | | |
|---|---|---|
| JP | 10-329357 | 12/1998 |
| JP | 3060327 | 4/2000 |

(Continued)

OTHER PUBLICATIONS

U.S. Appl. No. 12/960,834, filed on Dec. 6, 2010, by Tatsuno.

*Primary Examiner* — Hai C Pham
(74) *Attorney, Agent, or Firm* — Oblon, Spivak, McClelland, Maier & Neustadt, L.L.P.

(57) ABSTRACT

An optical scanner includes a light source, a deflector and a scanning optical system. The scanning optical system includes a first optical system including at least one resin scanning lens, and a second optical system between the target surface and one resin scanning lens. The second optical system includes at least one of a folding mirror(s) and a glass sheet(s), wherein $m1+g2=m2+g1$ is satisfied wherein $m1$ and $g1$ are respectively number of the folding mirror(s) and number of the glass sheet(s) to which the first ray has a shorter optical path than the second ray does, $m2$ and $g2$ are respectively number of the folding mirror(s) and number of the glass sheet(s) to which the first ray has a longer optical path than the second ray does.

20 Claims, 24 Drawing Sheets

U.S. PATENT DOCUMENTS

| | | |
|---|---|---|
| 2007/0253047 A1 | 11/2007 | Ichii et al. |
| 2007/0253048 A1 | 11/2007 | Sakai et al. |
| 2008/0055672 A1 | 3/2008 | Watanabe et al. |
| 2008/0068690 A1 | 3/2008 | Ichii |
| 2008/0123159 A1 | 5/2008 | Hayashi et al. |
| 2008/0192319 A1 | 8/2008 | Miyatake et al. |
| 2008/0212999 A1 | 9/2008 | Masuda et al. |
| 2008/0219601 A1 | 9/2008 | Arai et al. |
| 2008/0267662 A1 | 10/2008 | Arai et al. |
| 2008/0267663 A1 | 10/2008 | Ichii et al. |
| 2008/0285104 A1 | 11/2008 | Arai et al. |
| 2009/0141316 A1 | 6/2009 | Arai et al. |
| 2009/0175657 A1 | 7/2009 | Yoshii et al. |
| 2009/0195636 A1 | 8/2009 | Arai et al. |
| 2009/0195849 A1 | 8/2009 | Ichii et al. |
| 2009/0295900 A1 * | 12/2009 | Ichii ................................ 347/129 |
| 2009/0314927 A1 | 12/2009 | Tatsuno et al. |
| 2009/0315967 A1 | 12/2009 | Hayashi et al. |
| 2010/0060712 A1 | 3/2010 | Sato et al. |
| 2010/0124434 A1 | 5/2010 | Tatsuno |
| 2010/0195681 A1 | 8/2010 | Tatsuno et al. |
| 2010/0214633 A1 | 8/2010 | Sato et al. |
| 2011/0012982 A1 | 1/2011 | Arai |
| 2011/0141536 A1 * | 6/2011 | Tatsuno ..................... 359/204.1 |

FOREIGN PATENT DOCUMENTS

| | | |
|---|---|---|
| JP | 3518765 | 2/2004 |
| JP | 2007-147864 | 6/2007 |
| JP | 2009-3393 | 1/2009 |

* cited by examiner

FIG. 5
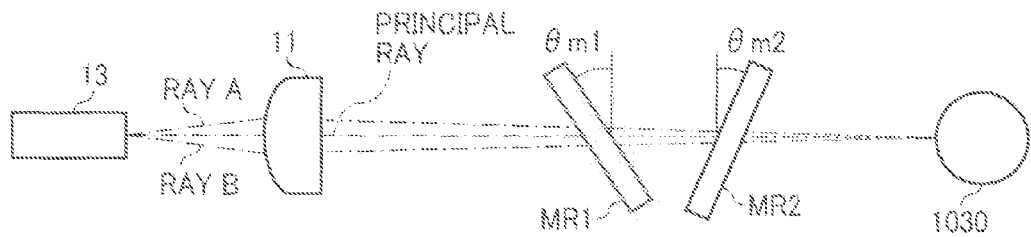
FIG. 6
| PHASE DIFFERENCE | | 0.0λ | 0.1λ | 0.2λ |
|---|---|---|---|---|
| θm | 30° | 0.0% | 0.1% | 0.5% |
| | 45° | 0.0% | 0.4% | 0.9% |
| | 60° | 0.0% | 0.5% | 1.6% |
| | -30° | 0.0% | 0.1% | -0.5% |
| | -45° | 0.0% | -0.1% | -1.1% |
| | -60° | 0.0% | -0.3% | -1.9% |
INCIDENT LIGHT: LINEARLY POLARIZED LIGHT
ANGLE OF INCIDENCE: 30 DEGREES
PRINCIPAL AXIS: 10 DEGREES
FIG. 7
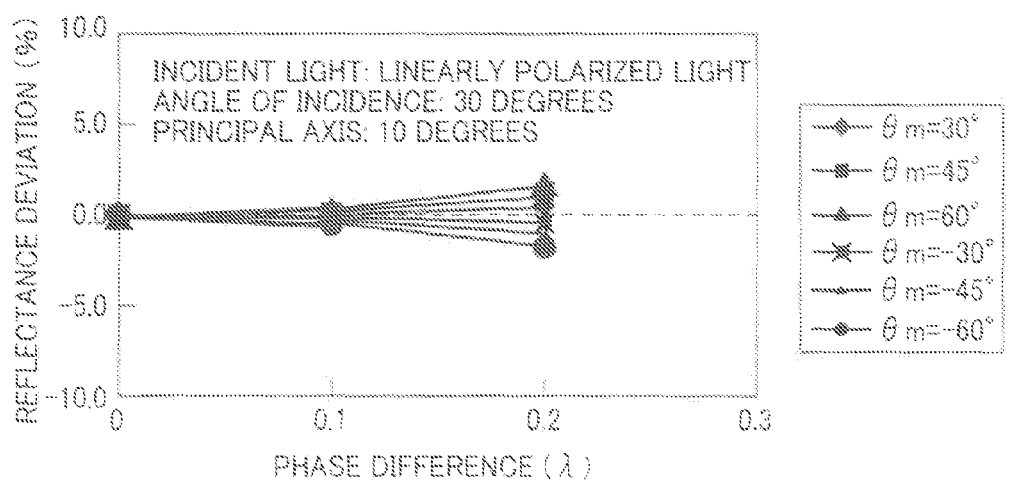

| PHASE DIFFERENCE | | 0.0λ | 0.1λ | 0.2λ |
|---|---|---|---|---|
| θm | 30° | 0.0% | -1.2% | -1.4% |
| | 45° | 0.0% | -1.6% | -2.7% |
| | 60° | 0.0% | -2.9% | -4.9% |
| | -30° | 0.0% | 1.5% | 2.9% |
| | -45° | 0.0% | 3.5% | 5.6% |
| | -60° | 0.0% | 5.6% | 8.1% |

INCIDENT LIGHT: CIRCULARLY POLARIZED LIGHT
ANGLE OF INCIDENCE: 30 DEGREES
PRINCIPAL AXIS: 10 DEGREES

| PHASE DIFFERENCE | | 0.0λ | 0.1λ | 0.2λ |
|---|---|---|---|---|
| θm | 30° | 0.0% | 0.4% | 1.2% |
| | 45° | 0.0% | 0.6% | 2.0% |
| | 60° | 0.0% | 0.9% | 2.5% |
| | -30° | 0.0% | -0.1% | -1.3% |
| | -45° | 0.0% | -0.3% | -2.0% |
| | -60° | 0.0% | -0.3% | -2.1% |

INCIDENT LIGHT: LINEARLY POLARIZED LIGHT
ANGLE OF INCIDENCE: 50 DEGREES
PRINCIPAL AXIS: 10 DEGREES

| PHASE DIFFERENCE | | 0.0λ | 0.1λ | 0.2λ |
|---|---|---|---|---|
| $\theta m$ | 30° | 0.0% | -2.0% | -3.5% |
| | 45° | 0.0% | -4.1% | -6.7% |
| | 60° | 0.0% | -5.2% | -9.1% |
| | -30° | 0.0% | 4.3% | 6.4% |
| | -45° | 0.0% | 5.2% | 8.2% |
| | -60° | 0.0% | 6.0% | 9.2% |

INCIDENT LIGHT: CIRCULARLY POLARIZED LIGHT
ANGLE OF INCIDENCE: 50 DEGREES
PRINCIPAL AXIS: 10 DEGREES

OPTICAL SCANNER AND IMAGE FORMING APPARATUS ADDRESSING UNEVEN BIREFRINGENCE DISTRIBUTION OF A SCANNING LENS

CROSS-REFERENCE TO RELATED APPLICATIONS

The present application claims priority to and incorporates by reference the entire contents of Japanese Patent Application No. 2010-055509 filed in Japan on Mar. 12, 2010.

BACKGROUND OF THE INVENTION

1. Field of the Invention

The present invention relates to an optical scanner and an image forming apparatus.

2. Description of the Related Art

In a digital copier, a laser printer, a laser facsimile, and the like, an image is written using an optical scanner. Such an optical scanner includes a light source having a light emitter, a first optical system that forms an image of a light beam output from the light source as a long linear image extending in a main-scanning direction, a deflector having a deflecting reflective surface disposed near a position where the linear image is formed to deflect a light beam output from the first optical system, and a second optical system that condenses a light beam deflected by the deflector to a spot of light on a surface to be scanned, so that the surface is scanned with the light beam. A so-called multi-beam optical scanner in which a surface to be scanned is scanned with a plurality of light beams by using a multi-beam light source having a plurality of light emitters is also well known.

An increasing number of molded plastic products have come to be used for optical elements in the optical scanner, especially as a lens (scanning lens) used in the second optical system because the molded plastic products are economical and a free form surface can be achieved relatively easily. A molded plastic scanning lens is also positively adopted in the multi-beam optical scanner, in the same manner as in the conventional optical scanner having a single-beam light source.

In a molded plastic scanning lens, the refractive index distribution tends to be uneven.

Therefore, Japanese Patent No. 3518765, for example, discloses an optical element used in a multi-beam optical scanner that optically scans a target surface with a plurality of light beams and that includes a multi-beam light source having a plurality of light-emitting points, a first optical system that forms images with the light beams output from the light source as a plurality of long linear images extending in the main-scanning direction, an optical deflector having a deflective reflecting surface that deflects the light beams at a position near where the linear images are imaged, and a second optical system that condenses the deflected light beams into a plurality of light spots on the target surface. Such an optical element has an uneven refractive index distribution, and is a lens used in the second optical system. In this lens, a predetermined relationship is established between the number of multiple incident beams, the pitch of the principal rays of the multiple beams on the plane of incidence along the sub-scanning direction, the refractive index distribution, and the effective range in the sub-scanning direction corresponding to the effective write width of the target surface scanned by the light spots.

In addition, Japanese Patent Application Laid-open No. 2009-3393 discloses an optical scanner including a light source in which a plurality of light-emitting elements capable of performing optical modulation independently are arranged in the sub-scanning direction, a coupling optical element that converts the light beams output from the light-emitting elements into approximately parallel light beams, an aperture that defines the outer edge of the parallel light beams, a collimating optical element that collimates the form of the parallel beams in the sub-scanning direction, a deflecting element that deflects the collimated light beams for scanning, and a scanning optical system that forms images of the deflected scanning light beams to scan the target surface, in the order listed in this sentence. In this optical scanner, the scanning optical system includes a plurality of lenses including a resin lens having a positive power along the sub-scanning direction, and the aperture and the resin lens are in an optical conjugate relationship in the sub-scanning direction.

During a plastic molding process of an optical element, birefringence appears in a lens depending on its material, production conditions, its form, and other factors. Birefringence is a phenomenon where the refractive index becomes different for rays of light in directions perpendicular to each other, and is expressed by a main axis orientation and a phase difference. The main axis orientation herein has the same meaning as a fast axis orientation or a slow axis orientation.

Many scanning lenses are larger in size than pickup lenses (objective lenses), for example, used in an optical disk apparatus, and some molded plastic scanning lenses have an uneven birefringence distribution. In particular, a larger difference in thickness between the center and the peripherals of a lens, that is, a greater difference in thickness leads to more uneven birefringence distribution.

For example, it is assumed herein that, as illustrated in FIG. 40, two light beams (a beam 1 and a beam 2) output from different light emitters (ch1 and ch2) and separated from each other in the sub-scanning direction, pass through a scanning lens having a birefringence distribution illustrated in FIGS. 39A to 39C. In such a system, the birefringence of the scanning lens affects the beam 1 and the beam 2 differently. Therefore, as in an example illustrated in FIG. 41, the beam 1 and the beam 2, both of which are polarized linearly before being incident on the scanning lens, are polarized in a different manner after passing through the scanning lens. In FIG. 41, the beam 1 is elliptically polarized in a vertically elongated manner, and the beam 2 is elliptically polarized in a horizontally elongated manner. If a folding mirror is disposed between the scanning lens and the scanned surface, for example, because the reflectance of the beam 1 and that of the beam 2 are different on the folding mirror, the amounts of light on the scanned surface become different between ch1 and ch2. If the amounts of light on the scanned surface are different depending on the light emitters, the concentration of an output image might become uneven, and especially, banding might occur.

Furthermore, in a vertical cavity surface emitting laser array having a plurality of light emitters each outputting linearly polarized light, the direction of the polarity is rotated depending on the strength of the oscillation of the laser. The degree of the rotation differs in each of the light emitters (for example, see the paragraph 0003 in Japanese Patent Application Laid-open No. 2007-147864). If a vertical cavity surface emitting laser array having the light emitters outputting light with different polarization angles is affected by an uneven birefringence distribution, the difference in the amounts of light on the scanned surface is further increased, and the concentration of the output image would be more uneven, or banding would be more prominent.

Effects of an uneven refractive index distribution and an uneven birefringence distribution will now be explained. If a refractive index distribution is uneven, because the refractive power becomes different depending on a beam path, the light emitters have different focal points on the scanned surface, disadvantageously. This occurs only within a refractive optical system having a multi-beam light source and a scanning lens having an uneven refractive index distribution.

If the birefringence distribution is uneven, because the degree of birefringence becomes different depending on a beam path, the reflectance of the folding mirror and the transmittance of a dust preventing sheet glass, both of which are disposed between the molded plastic scanning lens and the scanned surface, become different for each of the beams. As a result, the amount of exposure on the scanned surface would be different for each of the light emitters, disadvantageously. This is caused by a multi-beam light source, a scanning lens having such an uneven birefringence distribution, and optical components (an optical reflecting member or an optical transmitting member) disposed between the scanning lens having an uneven birefringence distribution and the scanned surface. Such a system causes no difference in the amount of light on the scanned surface if no optical components are disposed between the scanning lens having an uneven birefringence distribution and the scanned surface.

As explained above, the effect of uneven birefringence distribution is different in quality from the effect of uneven refractive index distribution. Furthermore, the effect of the uneven birefringence distribution is not considered in the optical scanners disclosed in Japanese Patent No. 3518765 and Japanese Patent Application Laid-open No. 2009-3393.

In a vertical cavity surface emitting laser (hereinafter, also referred to as a "VCSEL"), it is known that a noise is generated when returning light enters the active layer. The returning light is light output from the light-emitting elements and reflected outside to return. Without any noise, a predetermined optical output can be obtained from an input current. However, when a noise is generated, the pulse waveform of the optical output is disturbed to change the amount of light emission. In such a case, a predetermined output cannot be obtained from an input current, and that results in an uneven density of the image.

The noise becomes larger when the wavelength of the returning light is closer to the wavelength of the light wave multiply reflected inside the resonator. The effect of the returning light in light beams output from an edge-emitting semiconductor laser (LD) is not so significant because a plurality of light beams having adjacent wavelengths are mixed in the light beams output from the LD as illustrated in FIG. 42 as an example.

On the contrary, in the light beams output from a VCSEL, the wavelength tends to exit in singularity as illustrated as an example in FIG. 43. This is because the wavelength of the resonator in the VCSEL is short, e.g., several wavelengths. Thus, in a VCSEL, returning light is highly likely to interfere with the light inside of the resonator, and therefore, a noise is highly likely to be produced.

For example, as illustrated in FIG. 44, in an optical system including a coupling lens for converting divergent light output from the VCSEL into parallel rays, and an aperture member for collimating the parallel rays, if the surface of the aperture member is not sufficiently processed to reduce the reflectance thereof (e.g., anti-reflection painting), weak light returns to the VCSEL to produce a noise.

To reduce the effect of the returning light in a VCSEL, it is effective to dispose a quarter-wave plate on the optical path of the light beams output from the VCSEL.

For example, in the manner illustrated in FIG. 45, when a quarter-wave plate is disposed between the coupling lens and the aperture member illustrated in FIG. 44, linearly polarized light output from the VCSEL (linearly polarized light oscillating in the vertical direction on the surface of the drawing in the example illustrated in FIG. 45) is converted into circularly polarized light after passing through the quarter-wave plate. The weak circularly polarized light reflected on the aperture member passes through the quarter-wave plate again, and is converted into linearly polarized light oscillating in a direction perpendicular to the direction of the oscillation of the linearly polarized light output from the VCSEL (linearly polarized light oscillating in the direction perpendicular to the surface of the drawing in the example illustrated in FIG. 45).

In this example, the returning light does not interfere with the light inside of the resonator even if the returning light enters the VCSEL. Thus, no noise is generated.

In this manner, use of a quarter-wave plate can reduce the sensitivity of the VCSEL to the returning light.

However, when a quarter-wave plate is used, the circularly polarized light becomes incident on the plastic-molded scanning lens, and that will worsen the problem of the birefringence. This is because the birefringence changes the degree of polarization of circularly polarized light more prominently than linearly polarized light. A "degree of polarization" herein means the optical intensity of a component oscillating in the main-scanning direction, the optical intensity of a component oscillating in the sub-scanning direction, and the rotation of elliptically polarized light along the long axis in a polarization.

For example, FIGS. 46A and 46B indicate a polarization of linearly polarized light oscillating in the sub-scanning direction after passing through a birefringent medium having a principal axis at 10 degrees and a phase difference of $0.1\lambda$, a polarization of the same light after passing through a birefringent medium having a principal axis at 10 degrees and a phase difference of $0.2\lambda$, a polarization of the same light after passing through a birefringent medium having a principal axis at 20 degrees and a phase difference of $0.1\lambda$, and a polarization of the same light after passing through a birefringent medium having a principal axis at 20 degrees and a phase difference of $0.2\lambda$.

Furthermore, FIGS. 47A and 47B indicate a polarization of circularly polarized light after passing through a birefringent medium having a principal axis at 10 degrees and a phase difference of $0.1\lambda$, a polarization of the same light after passing through a birefringent medium having a principal axis at 10 degrees and a phase difference of $0.2\lambda$, a polarization of the same light after passing through a birefringent medium having a principal axis at 20 degrees and a phase difference of $0.1\lambda$, and a polarization of the same light after passing through a birefringent medium having a principal axis at 20 degrees and a phase difference of $0.2\lambda$.

To calculate the polarizations, the Jones vector and the Jones matrix are used (see "Kogaku no kiso" (Basics of Optics), First Edition, Second Print, Corona Publishing Co., Ltd., pp. 145 to 149).

As may be clear when FIGS. 46B and 47B are compared, the polarization of the circularly polarized light changes more prominently than the linearly polarized light, after passing through a birefringent medium having the same principal axis and the same phase difference.

For example, to compare amounts of change as a ratio (Ix:Iy) between the square of Ex (the amplitude in an x direction) that is an optical intensity Ix in the x direction and the square of Ey (the amplitude in a y direction) that is an optical intensity Iy in the y direction, the linearly polarized light that is incident light at Ix:Iy=1:0 only changes to 0.99:0.01 after passing through the birefringent medium having the principal axis of 10 degrees and a phase difference of 0.1λ, for example. On the contrary, the circularly polarized light that is incident light at Ix:Iy=0.5:0.5 changes to the light at 0.60:0.40. It is clearly understandable, also from this numerical comparison, that circularly polarized light is more sensitive to a birefringence.

Light is more sensitive to a polarization change caused by a birefringence, which means that the reflectance of the light beams reflected on the folding mirror deviates greatly from the ideal after passing through the plastic-molded scanning lens.

If the reflectance deviates greatly from the ideal, utilization efficiency of the light on the target surface varies greatly depending on positions on the target surface in the main-scanning direction. Such variation might cause variations of amounts of light to exceed a correctable range (normally, 10 percent or so) of so-called shading correction in the main-scanning direction for controlling the optical output of a light source to make the amount of light uniform in the main-scanning direction. Inability of correcting such variation results in an uneven density in an output image.

SUMMARY OF THE INVENTION

It is an object of the present invention to at least partially solve the problems in the conventional technology.

According to one aspect of the present invention, an optical scanner includes a light source including a plurality of light-emitting elements, a deflector that deflects a light beam output from the light source and coupled, and a scanning optical system that condenses the light beam deflected by the deflector onto a target surface, and includes a first optical system composed of at least one resin scanning lens, and a second optical system disposed between the target surface and one resin scanning lens located nearest to the deflector in the first optical system and including a plurality of optical elements composed of at least either one of a folding mirror(s) and a glass sheet(s), wherein m1+g2=m2+g1 is satisfied concerning lengths of optical paths of a first ray and a second ray each included in a light beam being incident on the second optical system and being separated from each other in a rotating shaft direction of the deflector, the lengths of the optical paths being between the deflector and the respective optical elements included in the second optical system on a plane perpendicular to a main-scanning direction, where m1 is number of the folding mirror(s) to which the first ray has a shorter optical path than the second ray does, m2 is number of the folding mirror(s) to which the first ray has a longer optical path than the second ray does, g1 is number of the glass sheet(s) to which the first ray has a shorter optical path than the second ray does, and g2 is number of the glass sheet(s) to which the first ray has a longer optical path than the second ray does.

According to another aspect of the present invention, an optical scanner includes a light source including a plurality of light-emitting elements, a deflector that deflects a light beam output from the light source and coupled, and a scanning optical system that condenses the light beam deflected by the deflector onto a target surface, and includes a first optical system composed of at least one resin scanning lens, and a second optical system disposed between the target surface and one resin scanning lens located nearest to the deflector in the first optical system and including a plurality of optical elements composed of at least either one of a folding mirror(s) and a glass sheet(s), wherein m1+g2<m2+g1 is satisfied concerning lengths of optical paths of a first ray and a second ray each included in a light beam being incident on the second optical system and being separated from each other in a rotating shaft direction of the deflector, the lengths of the optical paths being between the deflector and the respective optical elements included in the second optical system on a plane perpendicular to a main-scanning direction, where m1 is number of the folding mirror(s) to which the first ray has a shorter optical path than the second ray does, m2 is number of the folding mirror(s) to which the first ray has a longer optical path than the second ray does, g1 is number of the glass sheet(s) to which the first ray has a shorter optical path than the second ray does, and g2 is number of the glass sheet(s) to which the first ray has a longer optical path than the second ray does, and reflectance or transmittance of the light beam being incident on one of the optical elements in the second optical system is different from reflectance or transmittance of the other optical element(s) included in the second optical system.

According to still another aspect of the present invention, an optical scanner includes a light source including a plurality of light-emitting elements, a deflector that deflects a light beam output from the light source and coupled, a scanning optical system that condenses the light beam deflected by the deflector onto a target surface, and includes a first optical system including at least one resin scanning lens and a second optical system including a plurality of folding mirrors and disposed between a resin scanning lens located nearest to the deflector in the first optical system and the target surface, and a quarter-wave plate disposed between the light source and the deflector, wherein an absolute value of $(\Sigma|\theta m1|-\Sigma|\theta m2|)$ is smaller than any one of $|\theta m1|$ and $|\theta m2\theta|$, concerning lengths of optical paths of a first ray and a second ray each included in a light beam being incident on the second optical system and being separated from each other in a rotating shaft direction of the deflector, the lengths of the optical paths being between the deflector and the respective optical elements included in the second optical system on a plane perpendicular to a main-scanning direction, where $\theta m1$ is an inclination angle of a folding mirror to which the first ray has a shorter optical path than the second ray does with reference to a plane perpendicular to a principal ray of a light beam being incident on the second optical system, and $\theta m2$ is an inclination angle of a folding mirror to which the first ray has a longer optical path than the second ray does with respect to the plane perpendicular to the principal ray of the light beam being incident on the second optical system.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a development diagram of the scanning optical system in the first exemplary configuration;

FIG. 6 is a first schematic for explaining deviations of reflectance on a reflection mirror when linearly polarized light is incident on a scanning lens at an incident angle of 30 degrees;

FIG. 7 is a second schematic for explaining the deviations of the reflectance on a reflection mirror when the linearly polarized light is incident on the scanning lens at an incident angle of 30 degrees;

DETAILED DESCRIPTION OF THE PREFERRED EMBODIMENTS

Figure 1:
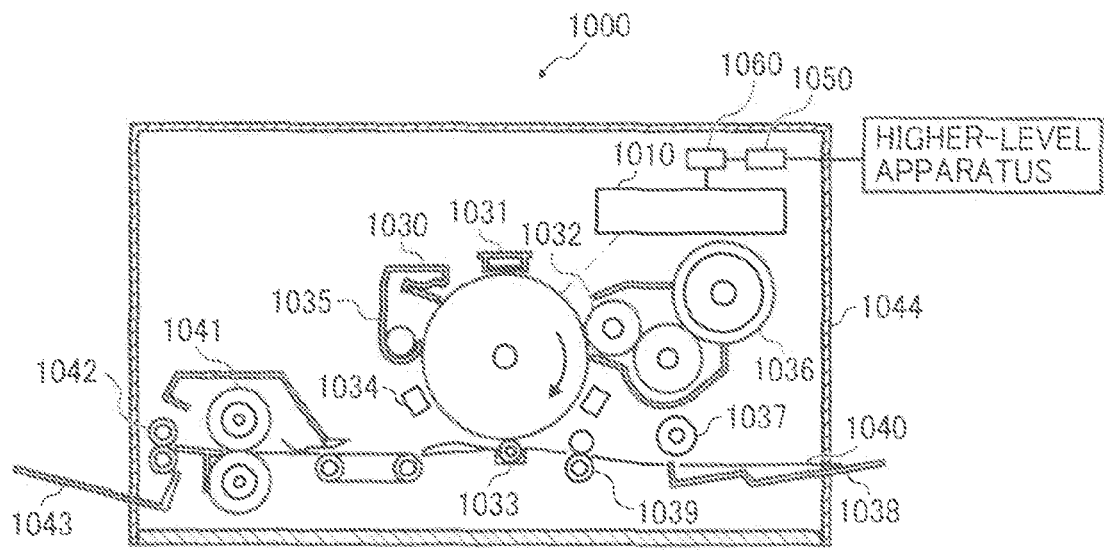
FIG. 1 is a schematic for explaining a general structure of a laser printer according to an embodiment of the present invention.

Exemplary embodiments of the present invention are explained below with reference to FIGS. 1 to 37. FIG. 1 is a schematic of a laser printer 1000 as an image forming apparatus according to an embodiment of the present invention.

The laser printer 1000 includes an optical scanner 1010, a photosensitive drum (photosensitive element) 1030, a charger 1031, a developing roller 1032, a transfer charger 1033, a neutralizing unit 1034, a cleaning unit 1035, a toner cartridge 1036, a paper feeding roller 1037, a paper feeding tray 1038, a registration roller pair 1039, a fixing rollers 1041, paper ejecting rollers 1042, a paper ejecting tray 1043, a communication controller 1050, and a printer controller 1060 that controls each of these units comprehensively. These units are housed in predetermined positions in a printer housing 1044.

The communication controller 1050 controls bidirectional communications with a higher level apparatus (e.g., a personal computer) via a network, for example.

The photosensitive drum 1030 is a cylindrical member, and a photosensitive layer is formed on its surface. In other words, the surface of the photosensitive drum 1030 is a surface to be scanned. The photosensitive drum 1030 is rotated in the direction pointed by the arrow in FIG. 1.

The charger 1031, the developing roller 1032, the transfer charger 1033, the neutralizing unit 1034, and the cleaning unit 1035 are arranged near the surface of the photosensitive drum 1030, and arranged sequentially in the order of the charger 1031, the developing roller 1032, the transfer charger 1033, the neutralizing unit 1034, and the cleaning unit 1035 in the rotating direction of the photosensitive drum 1030.

The charger 1031 charges the surface of the photosensitive drum 1030 uniformly.

The optical scanner 1010 irradiates the surface of the photosensitive drum 1030 charged by the charger 1031 with a light beam modulated based on image information received from the higher level apparatus. In this manner, a latent image corresponding to the image information is formed on the surface of the photosensitive drum 1030. The latent image thus formed is carried to the developing roller 1032 by rotation of the photosensitive drum 1030. A structure of the optical scanner 1010 will be explained later.

The toner cartridge 1036 stores therein a toner, and the toner is supplied to the developing roller 1032.

The developing roller 1032 attaches the toner supplied from the toner cartridge 1036 to the latent image formed on the surface of the photosensitive drum 1030 to visualize the image information. The latent image to which the toner is attached (also referred to as "toner image" hereinafter for convenience) is carried to the transfer charger 1033 by rotation of the photosensitive drum 1030.

Recording paper 1040 is stored in the paper feeding tray 1038. The paper feeding roller 1037 is disposed near the paper feeding tray 1038 to take out the recording paper 1040 one sheet at a time from the paper feeding tray 1038, and to convey the recording paper 1040 into the registration roller pair 1039. The registration roller pair 1039 temporarily maintains the recording paper 1040 taken out by the paper feeding roller 1037, and feeds the recording paper 1040 into the space between the photosensitive drum 1030 and the transfer charger 1033 in synchronization with rotation of the photosensitive drum 1030.

A voltage having an opposite polarity to the toner is applied to the transfer charger 1033 so that the toner attached to the surface of the photosensitive drum 1030 is electrically attracted to the recording paper 1040. By way of these voltages, the toner image on the surface of the photosensitive drum 1030 is transferred onto the recording paper 1040. The recording paper 1040 transferred with the toner image is sent to the fixing rollers 1041.

The fixing rollers 1041 apply heat and pressure to the recording paper 1040. In this manner, the toner is fixed to the recording paper 1040. The recording paper 1040 to which the toner is fixed is sent to the paper ejecting tray 1043 via the paper ejecting rollers 1042, and sequentially stacked in the paper ejecting tray 1043.

The neutralizing unit 1034 neutralizes the surface of the photosensitive drum 1030.

The cleaning unit 1035 removes the toner remaining on the surface of the photosensitive drum 1030 (residual toner). The surface of the photosensitive drum 1030 where the residual toner is removed returns to a position facing the charger 1031.

A configuration of the optical scanner 1010 will now be explained. The optical scanner 1010 includes a light source, a pre-deflector optical system, a polygon mirror, a scanning optical system including at least one resin scanning lens and a folding mirror, and a scanning control device, and these elements are fixed at predetermined positions in an optical housing.

Hereinafter, the direction along the longitudinal direction of the photosensitive element 1030 is explained as the Y axis direction in a three dimensional X-Y-Z Cartesian coordinate system, and the direction along the rotating shaft of the polygon mirror is explained as the Z axis direction.

Furthermore, a direction corresponding to the main-scanning direction is hereinafter simply referred to as a "main-scanning corresponding direction", and a direction corresponding to the sub-scanning direction is hereinafter simply referred to as a "sub-scanning corresponding direction" also for the purpose of convenience.

Various configurations are possible depending on factors such as the presence of a quarter-wave plate in the pre-deflector optical system, the presence of a sound insulating member in the polygon mirror, the number of folding mirrors included in the scanning optical system, positioning of the folding mirror(s) with respect to the light beams being incident thereon, the presence of a dust prevention glass in the optical housing, and positioning of the dust prevention glass with respect to the light beams being incident thereon.

Figure 2:
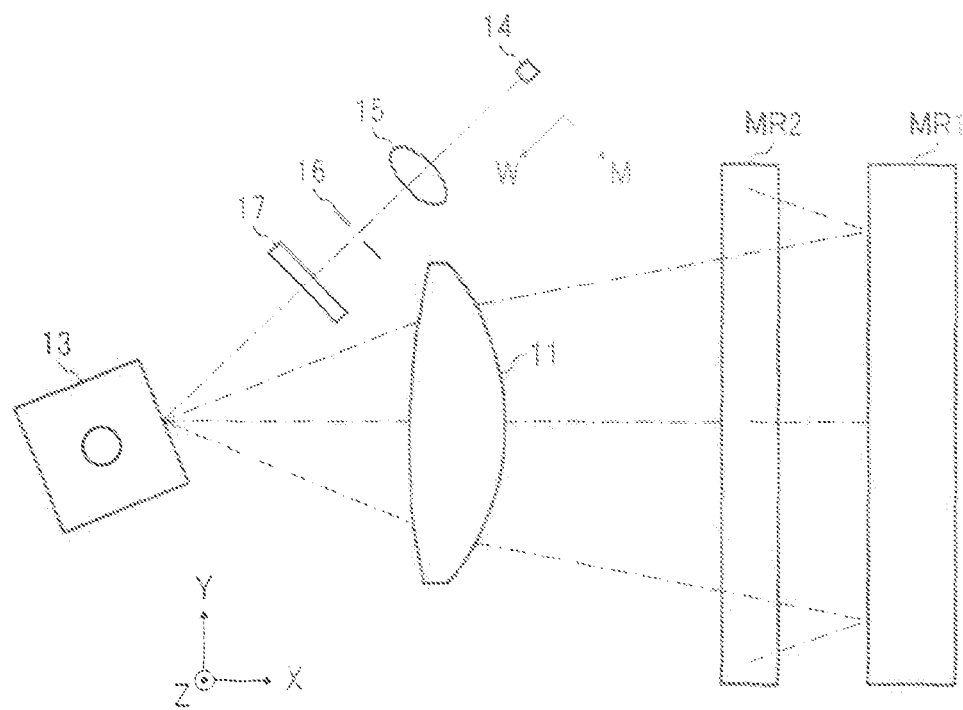
FIG. 2 is a first schematic for explaining a first exemplary configuration of an optical scanner.
Figure 3:
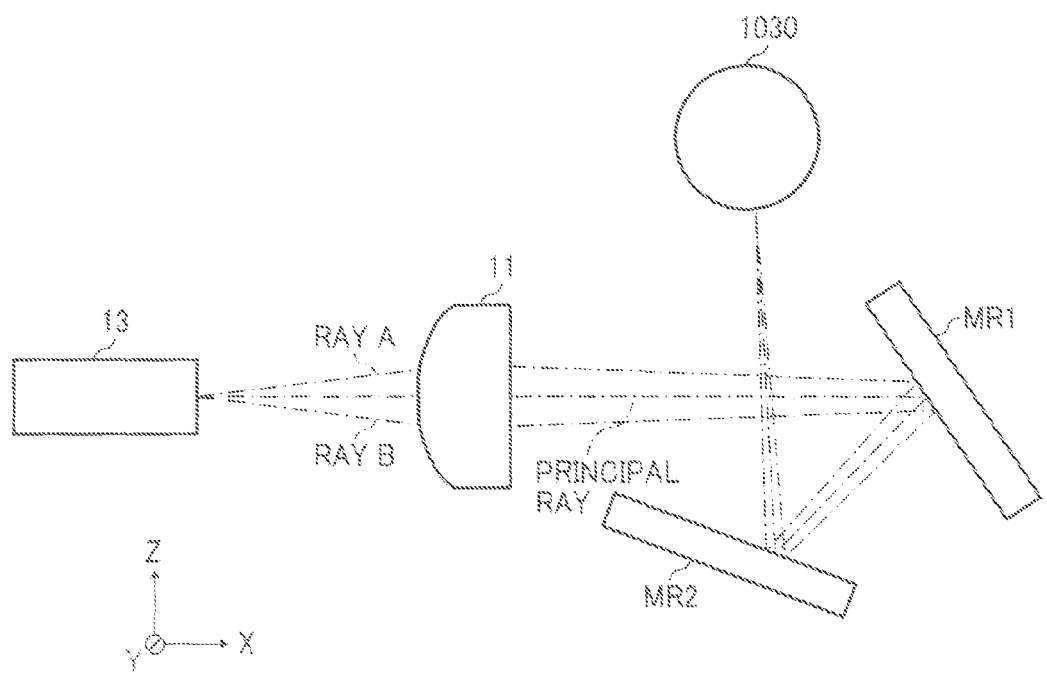
FIG. 3 is a second schematic for explaining the first exemplary configuration of the optical scanner.

In a first exemplary configuration, the optical scanner 1010 includes, as illustrated in FIGS. 2 and 3, a light source 14, a coupling lens 15, an aperture plate 16, a cylindrical lens 17, a polygon mirror 13, a scanning lens 11, two folding mirrors (MR1 and MR2), and a scanning control device (not illustrated).

The pre-deflector optical system includes the coupling lens 15, the aperture plate 16, and the cylindrical lens 17. The scanning optical system includes the scanning lens 11 and the two folding mirrors (MR1 and MR2).

Hereinafter, the direction of the optical axis of the coupling lens 15 will be referred to as a "W direction", and a direction perpendicular to the Z axis direction and to the W direction will be referred to as an "M direction".

Figure 4:
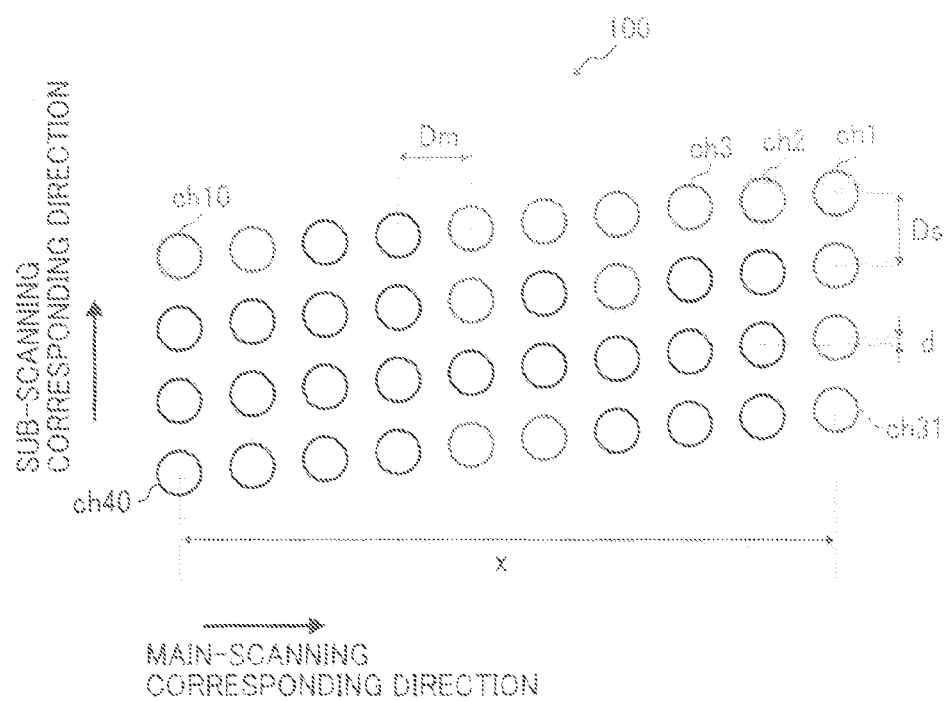
FIG. 4 is a schematic for explaining a surface emitting laser array included in a light source.

The light source 14 has a vertical cavity surface emitting laser array 100 on which a plurality of light-emitting elements are formed on a single substrate as illustrated as an example in FIG. 4.

The surface emitting laser array 100 includes forty light-emitting elements (ch1 to ch40) arranged in a two dimensional array and formed on a single substrate. The forty light-emitting elements are arranged so as to have an equally spaced light-emitting element pitch d when all of the light-emitting elements are orthographically projected onto a virtual line extending in the sub-scanning corresponding direction. A "light-emitting element pitch" used herein means the distance between the centers of two light-emitting elements.

In this example, d=2.5 micrometers. The light-emitting element pitch in the main-scanning corresponding direction is Dm=30 micrometers, and the light-emitting element pitch in the sub-scanning corresponding direction is Ds=25 micrometers. Therefore, the distance between the light-emitting elements that are farthest apart in the main-scanning corresponding direction is X=Dm×9=270 micrometers, and the distance between the light-emitting elements that are farthest apart in the sub-scanning corresponding direction is d×39=97.5 micrometers.

Each of the light-emitting elements has an oscillation wavelength in a 780 nanometer band. The light beam output from each of the light-emitting elements is linearly polarized.

The light source 14 includes a driving device for driving the light-emitting elements individually. In other words, the forty light beams can be used to scan the photosensitive element 1030 simultaneously.

Referring back to FIG. 2, the coupling lens 15 is arranged on the optical path of the light beams emitted from the light source 14 to convert the light beams into approximately parallel rays.

The aperture plate 16 has an aperture to collimate the light beams travelled through the coupling lens 15.

The cylindrical lens 17 has a high power in the sub-scanning corresponding direction (that is the same as the Z axis direction in this example), and forms images of the light beams travelled through the aperture of the aperture plate 16 in the sub-scanning corresponding direction at a position near a deflecting reflective surface of the polygon mirror 13.

The polygon mirror 13 is a four-faced mirror whose inscribed circle has a radius of 10 millimeters, and each face acts as a deflective reflecting surface. The polygon mirror 13 is rotated about a shaft laid in parallel with the Z axis direction at a constant speed to deflect the light beams coming through the cylindrical lens 17.

The scanning lens 11 is a plastic-molded scanning lens that is a resin scanning lens, and disposed on the optical paths of the light beams deflected on the polygon mirror 13.

The folding mirror MR1 is disposed on the optical paths of the light beams passed through the scanning lens 11, and the folding mirror MR2 is disposed on the optical paths of the light beams reflected on the folding mirror MR1.

Each of the folding mirrors has a mirror surface applied with coating of an aluminum film, and a material with a refractive index of 1.45 is applied to the mirror surface in a thickness of a half wavelength.

Out of two rays included in the light beam output from the light-emitting element ch1 and being separated from each other in the Z axis direction, the +Z side ray is denoted as a ray A, and the −Z side ray is denoted as a ray B (see FIG. 3).

FIG. 5 is a development diagram of FIG. 3, projected so that the optical path of each of the light beams travelling from the polygon mirror 13 to the photosensitive element 1030 forms a single line.

A folding mirror to which the ray A has a shorter optical path than the ray B from the plane of incidence on the polygon mirror 13 is herein defined as a folding mirror with a "β+" inclination angle property. On the contrary, a folding mirror to which the ray B has a shorter optical path than the ray A is herein defined as a folding mirror with a "β−" inclination angle property.

In this example, as may be seen from FIG. 5, the folding mirror MR1 is a folding mirror with a "β+" inclination angle property, and the folding mirror MR2 is a folding mirror with a "β−" inclination angle property. In other words, the number of folding mirrors with the "β+" inclination angle property is the same as the number of folding mirrors with the "β−" inclination angle property.

In this example, the number of folding mirrors with the "β+" inclination angle property is one, and the number of folding mirrors with the "β−" inclination angle property is one. The number of glass sheets with the "β+" inclination angle property is zero, and the number of glass sheets with the "β−" inclination angle property is zero.

Therefore, a relationship {(the number of folding mirrors with the "β+" inclination angle property)+(the number of glass sheets with the "β−" inclination angle property)}={(the number of folding mirrors with the "β−" inclination angle property)+(the number of glass sheets with the "β+" inclination angle property)} is satisfied.

In this case, a writing light beam destined to the photosensitive element is incident on the reflecting surface of the folding mirror MR1 and the reflecting surface of the folding mirror MR2 in opposite directions. Therefore, the polarization change caused by the uneven birefringence distribution of the scanning lens 11 has opposite effects to the reflectance of the folding mirror MR1 and the reflectance of the folding mirror MR2, and as a result, the variations of the light amount on the photosensitive element 1030 can be cancelled out.

In this manner, when the scanning optical system includes a plurality of folding mirrors, and the number of folding mirrors with the "β+" inclination angle property is equal to the number of folding mirrors with the "β−" inclination angle property, the effect of the uneven birefringence distribution of the scanning lens 11 can be reduced.

Figure 8A:
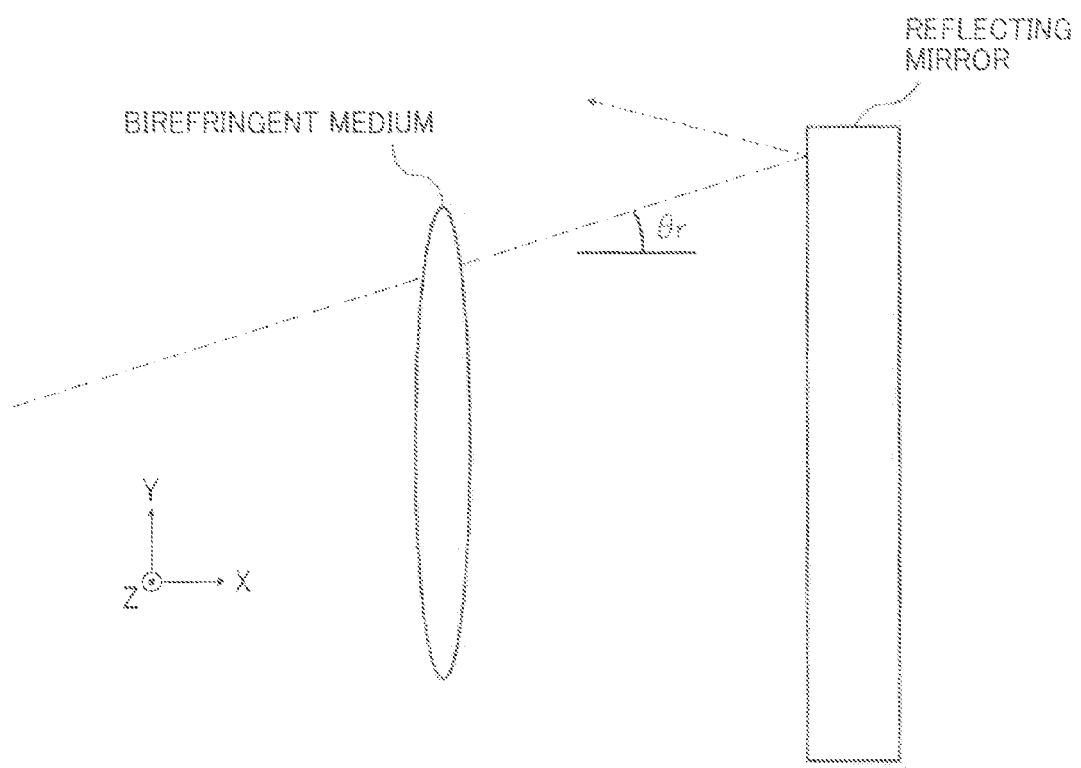
FIG. 8A is a schematic for explaining an incident angle.
Figure 8B:
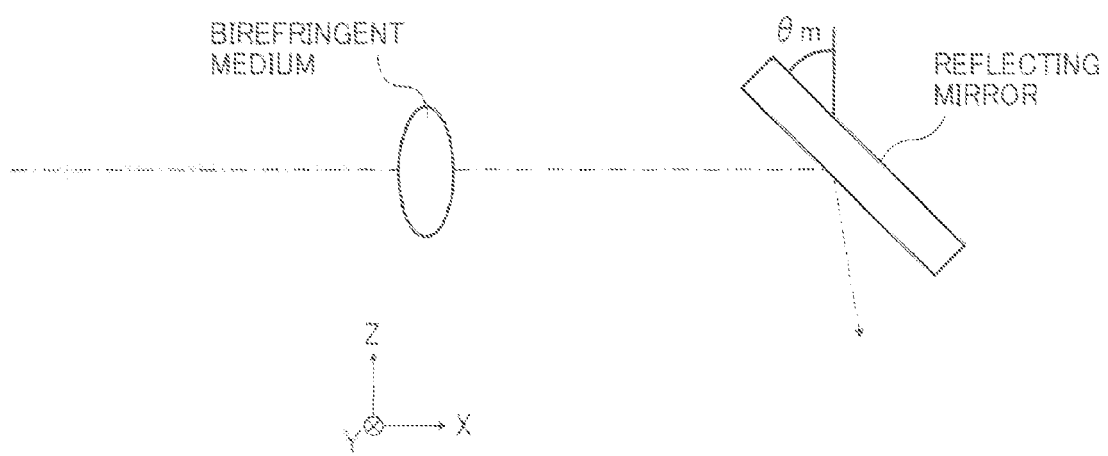
FIG. 8B is a schematic for explaining an inclination angle.

FIGS. 6 and 7 indicate the amount of deviations from the ideal reflectance (in percentage) of light being incident on a reflecting mirror that is equivalent of the folding mirror (the reflectance without the effect of the birefringence) when the light is linearly polarized, and is incident on the reflecting mirror at a half-field angle θr of 30 degrees after passing through a birefringent medium as illustrated in FIGS. 8A and 8B. In this example, the birefringence of the birefringent medium has a fixed principal axis of 10 degrees, and the phase difference is modified between zero (without any birefringence), 0.1λ, and 0.2λ. It can be seen from FIGS. 6 and 7 that the reflectance deviates greatly when the inclination angle θm of the reflecting mirror is large, and when the phase difference is large.

In the first exemplary configuration, when the inclination angle θm1 of the folding mirror MR1 is 30 degrees, the inclination angle θm2 of the folding mirror MR2 is −60 degrees, and the birefringence has a principal axis of 10 degrees and a phase difference of 0.2λ, for example, the deviation of the reflectance on the folding mirror MR1 is 0.5 percent, and the deviation of the reflectance on the folding mirror MR2 is −1.9 percent. Therefore, 0.5 percent worth of reflectance deviation can be cancelled out. As a result, a deviation from the ideal light utilization efficiency can be reduced to −1.4 percent. In practice, a polarization changes when the light is reflected on the folding mirror MR1. However, such a polarization change has only a limited effect to the deviation of the reflectance on the folding mirror MR2. Therefore, such a polarization change caused when the light is reflected on the folding mirror MR1 is herein ignored.

Other exemplary configurations will now be explained. In explaining these exemplary configurations, differences with the first exemplary configuration will be mainly described. The elements that are the same or equivalent to those in the first exemplary configuration will be given the same reference numerals, and explanations thereof are simplified or omitted hereunder.

Figure 9:
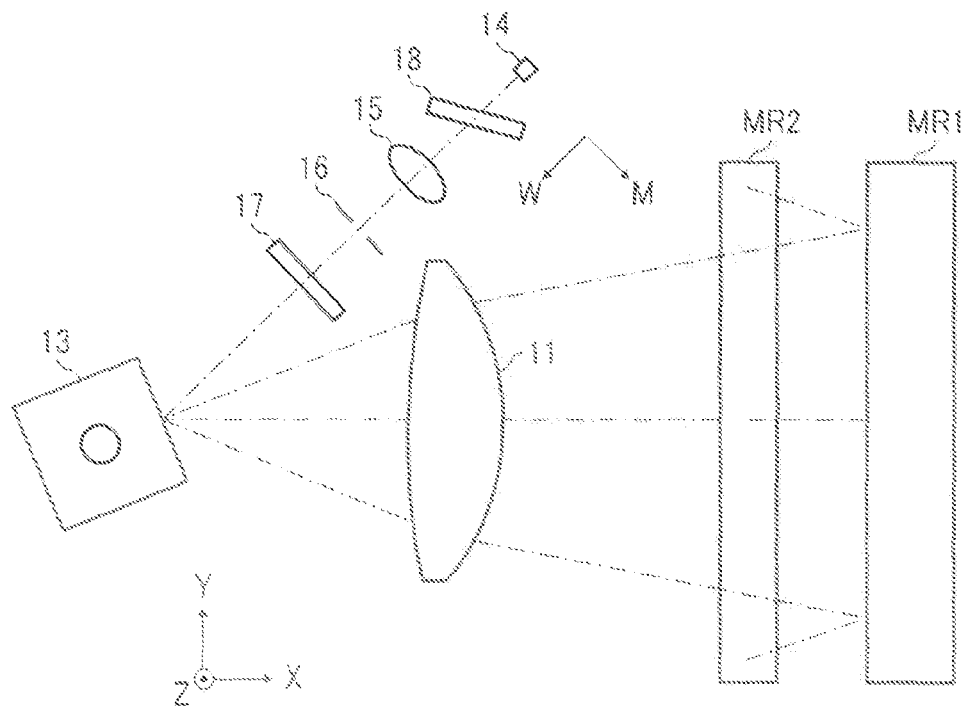
FIG. 9 is a first schematic for explaining a second exemplary configuration of the optical scanner.
Figure 10:
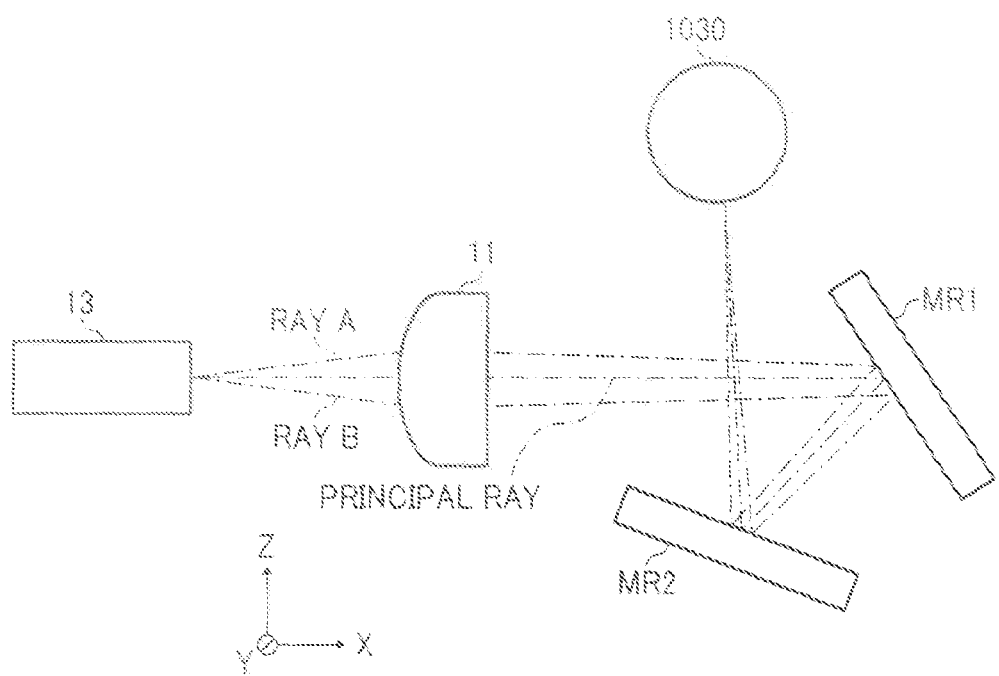
FIG. 10 is a second schematic for explaining the second exemplary configuration of the optical scanner.

In a second exemplary configuration, the optical scanner 1010 includes, as illustrated in FIGS. 9 and 10, the light source 14, a quarter-wave plate 18, the coupling lens 15, the aperture plate 16, the cylindrical lens 17, the polygon mirror 13, the scanning lens 11, the two folding mirrors (MR1 and MR2), and the scanning control device (not illustrated).

The pre-deflector optical system includes the quarter-wave plate 18, the coupling lens 15, the aperture plate 16, and the cylindrical lens 17. The scanning optical system includes the resin scanning lens 11 and the two folding mirrors (MR1 and MR2).

The quarter-wave plate 18 is disposed on the optical path between the light source 14 and the coupling lens 15. The quarter-wave plate 18 is inclined with reference to a plane perpendicular to the optical axis of the coupling lens 15. This arrangement enables the effect of the returning light to be further reduced.

The linearly polarized light output from the light source 14 (linearly polarized light oscillating in the direction perpendicular to the surface of the drawing in FIG. 9) is converted into circularly polarized light after passing through the quarter-wave plate 18, and further converted into elliptically polarized light after passing through the scanning lens 11.

Figures 11, 12:
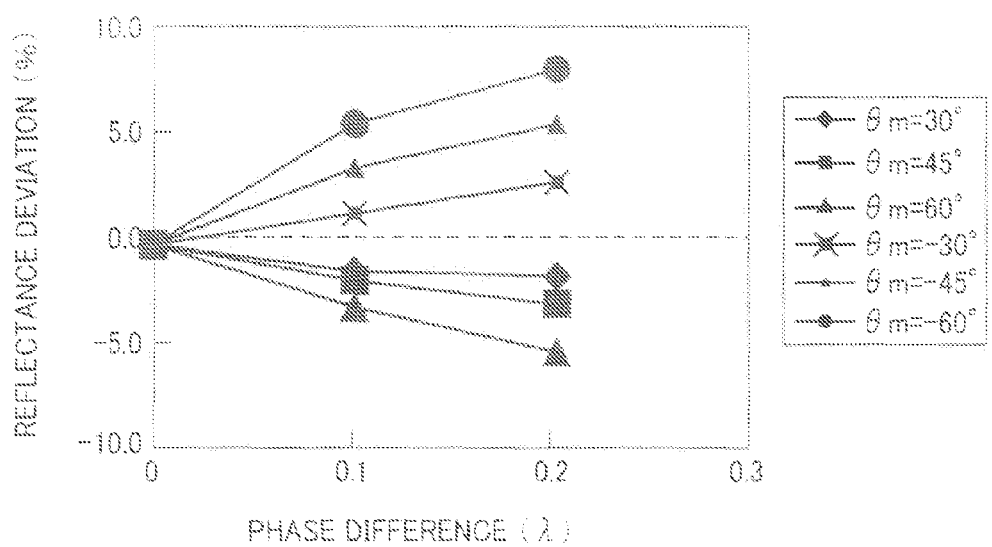
FIG. 11 is a first schematic for explaining deviations of reflectance on a reflection mirror when circularly polarized light is incident on the scanning lens at an incident angle of 30 degrees.
FIG. 12 is a second schematic for explaining the deviations of the reflectance on a reflection mirror when the circularly polarized light is incident on the scanning lens at an incident angle of 30 degrees.

FIGS. 11 and 12 indicate the amount of deviations from the ideal reflectance (in percentage) of light being incident on a reflecting mirror that is equivalent of the folding mirror (the reflectance without the effect of the birefringence) when the light is circularly polarized, and is incident on the reflecting mirror at a half-field angle θr of 30 degrees after passing through a birefringent medium. In this example, the birefringence of the birefringent medium has a fixed principal axis of 10 degrees, and the phase difference is modified between zero (without any birefringence), 0.12λ, and 0.2λ. It can be seen from FIGS. 11 and 12 that the reflectance deviates greatly when the inclination angle θm of the reflecting mirror is large, and when the phase difference is large. In the second exemplary configuration, the reflectance deviates several to several ten times more greatly than the first exemplary configuration, although the light passes through the same birefringent medium.

In the second exemplary configuration, if the inclination angle θm1 of the folding mirror MR1 is set to 30 degrees and the inclination angle θm2 of the folding mirror MR2 is set to −60 degrees in the same manner as in the first exemplary configuration, while the birefringence has a principal axis of 10 degree and a phase difference of 0.2λ, the reflectance on the folding mirror MR1 deviates by −1.4 percent, and the reflectance on the folding mirror MR2 deviates by 8.1 percent. Therefore, 1.4 percent worth of reflectance deviation can be cancelled out. However, an eventual deviation from the ideal light utilization efficiency is 6.7 percent, which is approximately 4.8 times of that in the first exemplary configuration.

At this time, if the inclination angle θm2 of the folding mirror MR2 is set to −45 degrees, the deviation of the reflectance on the folding mirror MR2 is reduced to 5.6 percent. In this manner, the eventual deviation of the light utilization efficiency can be reduced to 4.2 percent. Alternatively, the inclination angle θm1 of the folding mirror MR1 can be set to 45 degrees to reduce the deviation in the reflectance on the folding mirror MR1 to −2.7 percent. In this case, the eventual deviation of the light utilization efficiency can be reduced to 5.4 percent.

In this manner, if a quarter-wave plate is used upon inputting circularly polarized light to a birefringent medium, the cancelling effect of a reflectance deviation can be improved by bringing the absolute value of the inclination angle of the folding mirror with the "β+" inclination angle property closer to the absolute value of the inclination angle of the folding mirror with the "β−" inclination angle property in the scanning optical system, and the variations in the light amount can be reduced to the correctable range of the shading correction.

A principal axis of between 0 to 20 degrees and a phase difference of 0 to 0.2λ or so are the ranges that are usually employed as the amount of birefringence in the scanning lens. A birefringence higher than those is not preferably employed because such a birefringence might cause deteriorations in wave front aberration or deteriorations in the beam spot diameter.

If the birefringence is higher than those ranges, it is preferable that the following formulas (1) to (3) be satisfied.

$$|θm1|-|θm2θ|<|θm1| \quad (1)$$

$$|θm1|-|θm2|<|θm2| \quad (2)$$

$$-15≤|θm1|-|θm2|≤15 \quad (3)$$

More specifically, if $|θm1|=45$ degrees and $|θm2|=60$ degrees, then $|θm1|-|θm2|=-15$ degrees. Therefore, formulas (1) to (3) are satisfied.

On the contrary, if $|θm1|=30$ degrees and $|θm2|=60$ degrees, then $|θm1|-|θm2|=-30$ degrees. Therefore, formulas (1) to (3) are not satisfied.

Formulas (1) to (3) suggest that there is no folding mirror with an excessively large inclination angle formed by the other folding mirror.

When there are a plurality of folding mirrors with the "β+" inclination angle property (MR11, MR12, MR13, . . . ) and a plurality of folding mirrors with the "β−" inclination angle property (MR21, MR22, MR23, . . . ), it is preferable that the following formulas (4) to (6) be satisfied, where the inclination angles of the respective folding mirrors are θm11, θm12, θm13, . . . , θm21, θm22, θm23, . . . .

$$Σ|θm1|-Σ|θm2|<|θm1n| \quad (4)$$

$$Σ|θm1|-Σ|θm2|<|θm2n| \quad (5)$$

$$-15≤Σ|θm1|-Σ|θm2|≤15 \quad (6)$$

Where, $Σ|θm1|$ represents the following formula (7), and $Σ|θm2|$ represents the following formula (8).

$$Σ|θm1|=|θm11|+|θm12|+|θm13|+ \quad (7)$$

$$Σ|θm2|=|θm21|+|θm22|+|θm23|+ \quad (8)$$

θm1n in formula (4) represents any one of θm11, θm12, θm13, . . . , and θm2n in formula (5) represents any one of θm21, θm22, θm23, . . . .

A third exemplary configuration is characterized in that θr in the first exemplary configuration is changed to 50 degrees.

Figures 13, 14:
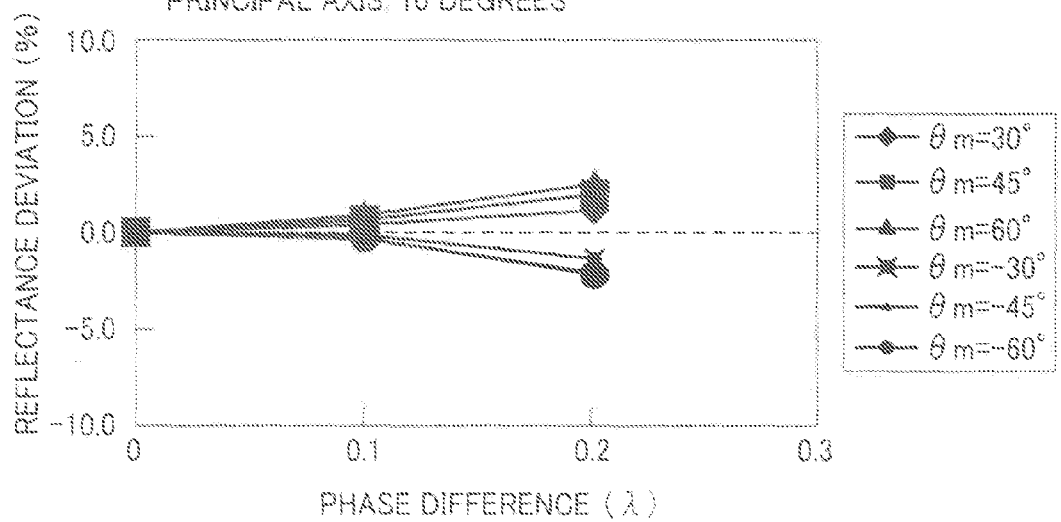
FIG. 13 is a first schematic for explaining deviations of reflectance on a reflection mirror when linearly polarized light is incident on a scanning lens at an incident angle of 50 degrees.
FIG. 14 is a second schematic for explaining the deviations of the reflectance on a reflection mirror when the linearly polarized light is incident on the scanning lens at an incident angle of 50 degrees.

FIGS. 13 and 14 indicate the amount of deviations from the ideal reflectance (in percentage) of light being incident on a reflecting mirror that is equivalent of the folding mirror (the reflectance without the effect of the birefringence) when the light is linearly polarized and is incident on the reflecting mirror at a half-field angle θr of 50 degrees after passing through a birefringent medium. In this example, the birefringence of the birefringent medium has a fixed principal axis of 10 degrees, and the phase difference is modified between zero (without any birefringence), 0.1λ, and 0.2λ. In this configuration, the reflectance deviates greatly from the ideal compared with the first exemplary configuration.

If the inclination angle θm1 of the folding mirror MR1 is set to 30 degrees, and the inclination angle θm2 of the folding mirror MR2 is set to −60 degrees in the same manner as in the first exemplary configuration, while the birefringence has a principal axis of 10 degrees and a phase difference of 0.2λ, the deviation in the reflectance on the folding mirror MR1 is 1.2 percent, and the deviation in the reflectance on the folding mirror MR2 is −2.1 percent. Therefore, 1.2 percent worth of reflectance deviation can be cancelled out, and the eventual deviation of the light utilization efficiency from the ideal can be reduced to −0.9 percent. This is at the same level as that in the first exemplary configuration.

To compare the third exemplary configuration with the first exemplary configuration, if θr is increased, a deviation from the ideal reflectance also increases. However, a deviation in the overall light utilization efficiency can be suppressed by bringing the absolute value of the inclination angle of the folding mirror with the "β+" inclination angle property closer to the absolute value of the inclination angle of the folding mirror with the "β−" inclination angle property in the same manner as in the first exemplary configuration.

A fourth exemplary configuration is characterized in that θr in the second exemplary configuration is changed to 50 degrees.

Figures 15, 16:
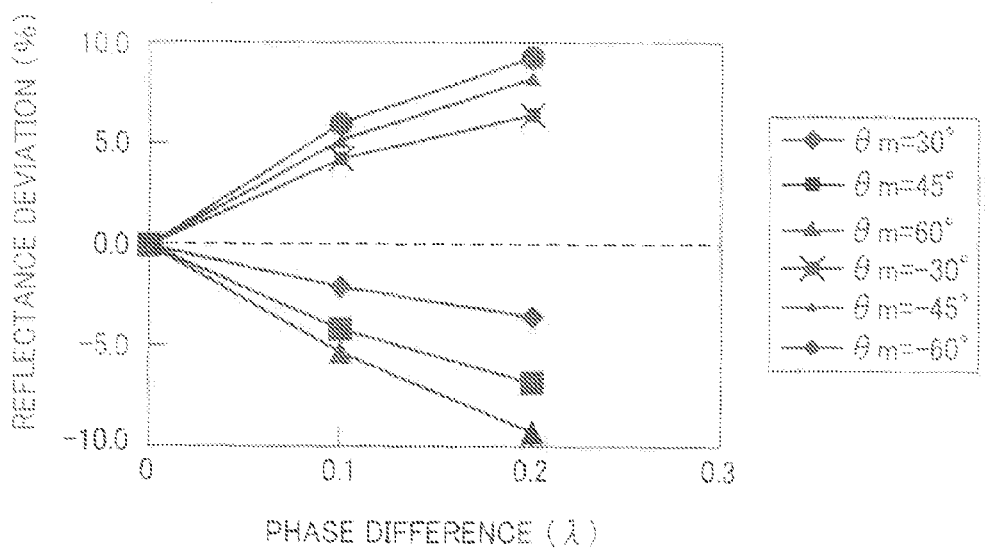
FIG. 15 is a first schematic for explaining deviations of reflectance on a reflection mirror when circularly polarized light is incident on the scanning lens at an incident angle of 50 degrees.
FIG. 16 is a second schematic for explaining the deviations of the reflectance on a reflection mirror when the circularly polarized light is incident on the scanning lens at an incident angle of 50 degrees.

FIGS. 15 and 16 indicate the amount of deviations from the ideal reflectance (in percentage) of light being incident on a reflecting mirror that is equivalent of the folding mirror (the reflectance without the effect of the birefringence) when the light is circularly polarized and is incident on the reflecting mirror at a half-field angle θr of 50 degrees after passing through a birefringent medium. In this example, the birefringence of the birefringent medium has a fixed principal axis of 10 degrees, and the phase difference is modified between zero (without any birefringence), 0.1λ, and 0.2λ. In this example, the reflectance deviates greatly from the ideal compared with the second exemplary configuration.

If the inclination angle θm1 of the folding mirror MR1 is set to 30 degrees, and the inclination angle θm2 of the folding mirror MR2 is set to −60 degrees in the same manner as in the second exemplary configuration, while the birefringence has a principal axis of 10 degrees and a phase difference of 0.2λ, the deviation of the reflectance on the folding mirror MR1 is −3.5 percent, and the deviation of the reflectance on the folding mirror MR2 is 9.2 percent. Therefore, 3.5 percent worth of reflectance deviation can be cancelled out, and the eventual deviation from the ideal utilization efficiency can be reduced to 5.7 percent. This is a level lower than that in the second exemplary configuration.

If the inclination angle θm1 of the folding mirror MR1 is set to 45 degrees, the reflectance deviation is −6.7 percent, and the overall light utilization efficiency deviation can be reduced to 2.5 percent.

To compare the fourth exemplary configuration with the second exemplary configuration, if θr is increased, a deviation from the ideal reflectance also increases. However, the overall light utilization efficiency deviation can be suppressed by bringing the absolute value of the inclination angle of the folding mirror with the "β+" inclination angle property closer to the absolute value of the inclination angle of the folding mirror with the "β−" inclination angle property in the same manner as in the second exemplary configuration.

When the light beam being incident on the scanning lens 11 is circularly polarized, formulas (1) to (3) are satisfied, and when there is no folding mirror with an inclination angle excessively larger than the other, such conditions contribute to suppressions of the overall light utilization efficiency deviations.

Within the scope of our examinations performed using (1) a practical angle of incidence θr (<50 degrees), (2) a practical folding mirror with a largest difference between the reflectance of s polarized light and the reflectance of p polarized light (folding mirror with a single layer of coating), and (3) the practical amount of the birefringence (a phase difference of 0.2λ or less), the overall light utilization efficiency deviation can be reduced to equal to or less than 5.4 percent by keeping the difference between the absolute value of the inclination angle of the folding mirror with the "β+" inclination angle property and the absolute value of the inclination angle of the folding mirror with the "β−" inclination angle property to equal to or less than 15 degrees.

Using 10 percent, which is the amount corresponding to the limit of the shading correction, as a reference, it is quite feasible to keep the amount of shading of the other optical elements under common conditions to 4.6 percent or less, which is calculated by subtracting 5.4 percent from 10 percent, in the case of circularly polarized light (the reflectance on the polygon mirror is almost the same at any angle).

Therefore, when the light source includes a surface emitting laser element, a quarter-wave plate is used to reduce the effect of the returning light, and when a plastic-molded scanning lens is employed, it is preferable to set the inclination angle of each of the folding mirrors in a manner satisfying formulas (1) to (3), or formulas (4) to (6).

Figure 17:
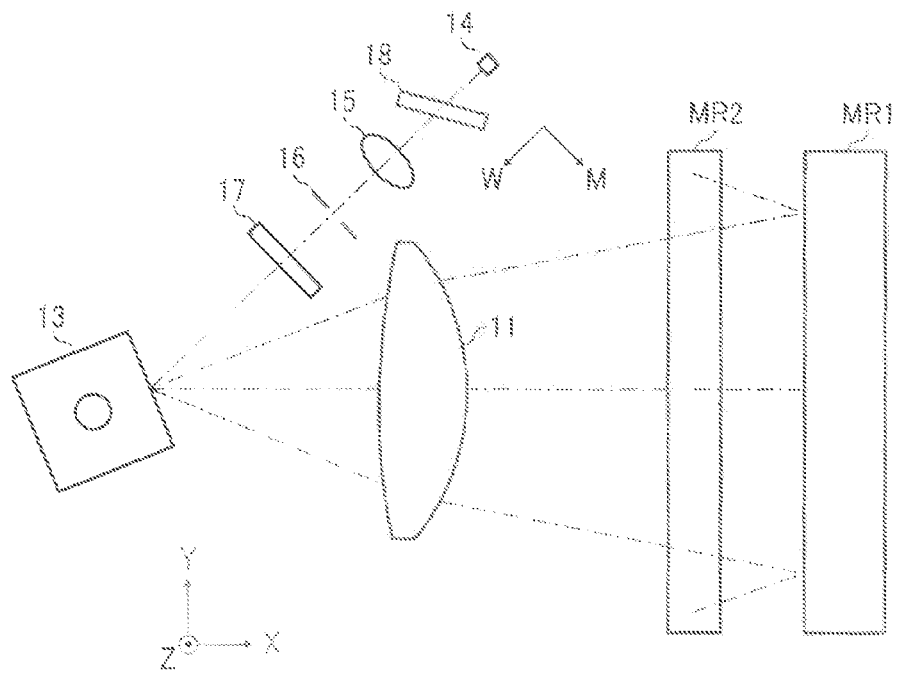
FIG. 17 is a first schematic for explaining a fifth exemplary configuration of the optical scanner.
Figure 18:
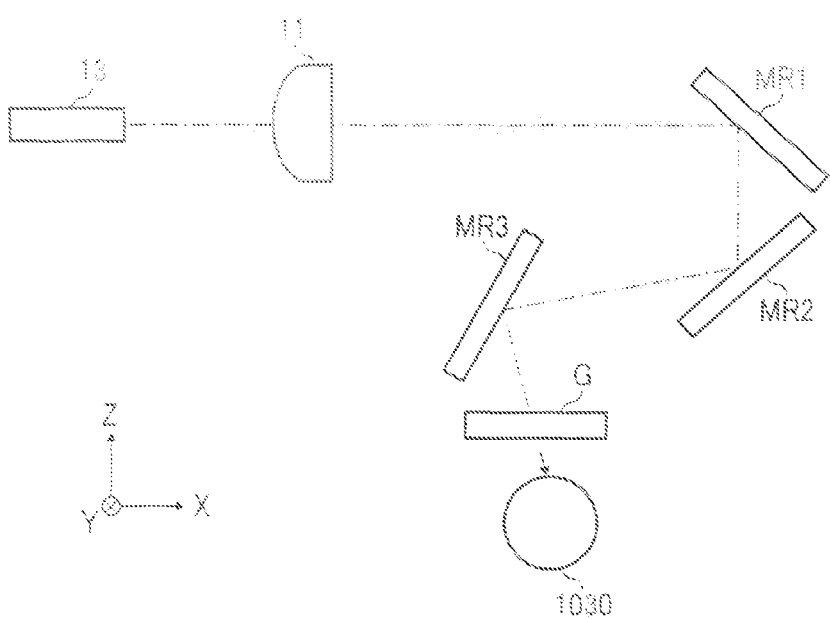
FIG. 18 is a second schematic for explaining the fifth exemplary configuration of the optical scanner.

In a fifth exemplary configuration, the optical scanner 1010 includes, as illustrated in FIGS. 17 and 18, the light source 14, the quarter-wave plate 18, the coupling lens 15, the aperture plate 16, the cylindrical lens 17, the polygon mirror 13, the scanning lens 11, three folding mirrors (MR1, MR2, and MR3), a dust prevention glass G, and the scanning control device (not illustrated).

Figure 19:
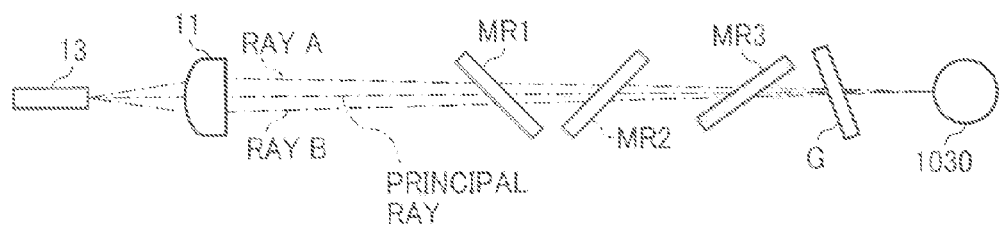
FIG. 19 is a development diagram of the scanning optical system in the fifth exemplary configuration.

In this configuration, the inclination angle property of the folding mirror MR1 is "β+", and the inclination angle properties of the folding mirrors MR2 and MR3 are "β−" (see FIG. 19).

The inclination angle property of the dust prevention glass G is "β+".

In this example, the number of folding mirrors with the "β+" inclination angle property is one, the number of folding mirrors with the "β−" inclination angle property is two, the number of glass sheets with the "β+" inclination angle property is one, and the number of glass sheets with the "β−" inclination angle property is zero.

Therefore, a relationship {(the number of folding mirrors with the "β+" inclination angle property)+(the number of glass sheets with the "β−" inclination angle property)}<{(the number of folding mirrors with the "β−" inclination angle property)+(the number of glass sheets with the "β+" inclination angle property)} is satisfied.

In addition, the following formulas (9) to (13) are satisfied, where θm1 is the inclination angle of the folding mirror MR1, θm2 is the inclination angle of the folding mirror MR2, θm3 is the inclination angle of the folding mirror MR3, and θg is the inclination angle of the dust prevention glass G.

$$|\theta m1|-(|\theta m2|+|\theta m3|)-2|\theta g|<|\theta m1| \quad (9)$$

$$|\theta m1|-(|\theta m2|+|\theta m3|)-2|\theta g|<|\theta m2| \quad (10)$$

$$|\theta m1|-(|\theta m2|+|\theta m3|)-2|\theta g|<|\theta m3| \quad (11)$$

$$|\theta m1|-(|\theta m2|+|\theta m3|)-2|\theta g|<2|\theta g| \quad (12)$$

$$-15\leq|\theta m1|-(|\theta m2|+|\theta m3|)-2|\theta g|\leq15 \quad (13)$$

A dust prevention glass has two interfaces for light because light passes through a dust prevention glass. In other words, the light receives the effect of the plastic-molded scanning lens twice in the dust prevention glass. Therefore, the coefficient of |θg| in formulas (9) to (13) is set to two.

A reflectance deviation on the dust prevention glass caused by the birefringence behaves (changes) in the same manner as a reflectance deviation on the folding mirror. This means that the behavior of the transmittance deviation on the dust prevention glass has a reversed sign of the reflectance deviation on the folding mirror. Therefore, to consider the overall light utilization efficiency, the reflectance deviation cancelling effect of the dust prevention glass is in the reversed sign to that of the folding mirror.

In this example, the behaviors of the reflectance deviation on the folding mirror MR3 and the transmittance deviation on the dust prevention glass G change in reversed signs to cancel out each other.

More specifically, when θm1=45 degrees, θm2=−45 degrees, θm3=−55 degrees, and θg=−20 degrees, |θm1|−(|θm2|+|θm3|)−2|θg| is 15, and formulas (9) to (13) are satisfied.

When the scanning optical system includes a plurality of folding mirrors with the "β+" inclination angle property (MR11, MR12, MR13, ... ), a plurality of folding mirrors with the "β−" inclination angle property (MR21, MR22, MR23, ... ), a plurality of glass sheets with the "β+" inclination angle property (G11, G12, G13, ... ), and a plurality of glass sheets with the "β−" inclination angle property (G21, G22, G23, ... ), it is preferable that the following formulas (14) to (18) be satisfied, where the respective inclination angles are denoted as θm11, θm12, θm13, ..., θm21, θm22, θm23, ..., θg11, θg12, θg13, ..., and θg21, θg22, θg23, ....

$$\Sigma|\theta m1|-\Sigma|\theta m2|-2\Sigma|\theta g1|+2\Sigma|\theta g2|<|\theta m1n| \quad (14)$$

$$\Sigma|\theta m1|-\Sigma|\theta m2|-2\Sigma|\theta g1|+2\Sigma|\theta g2|<|\theta m2n| \quad (15)$$

$$\Sigma|\theta m1|-\Sigma|\theta m2|-2\Sigma|\theta g1|+2\Sigma|\theta g2|<|\theta g1n| \quad (16)$$

$$\Sigma|\theta m1|-\Sigma|\theta m2|-2\Sigma|\theta g1|+2\Sigma|\theta g2|<|\theta g1n| \quad (17)$$

$$-15 \leq \Sigma|\theta m1|-\Sigma|\theta m2|-2\Sigma|\theta g1|+2\Sigma|\theta g2| \leq 15 \quad (18)$$

Where, $\Sigma|\theta m1|$ represents formula (7), $\Sigma|\theta m2|$ represents formula (8), $\Sigma|\theta g1|$ represents formula (19) below, and $\Sigma|\theta g2|$ represents formula (20) below.

$$\Sigma|\theta g1|=|\theta g11|+|\theta g12|+|\theta g13|+ \quad (19)$$

$$\Sigma|\theta g2|=|\theta g21|+|\theta g22|+|\theta g23|+ \quad (20)$$

θg1n in formula (16) represents any one of θg11, θg12, θg13, ..., and θg2n in formula (17) represents any one of θg21, θg22, θg23, ....

Figure 20:
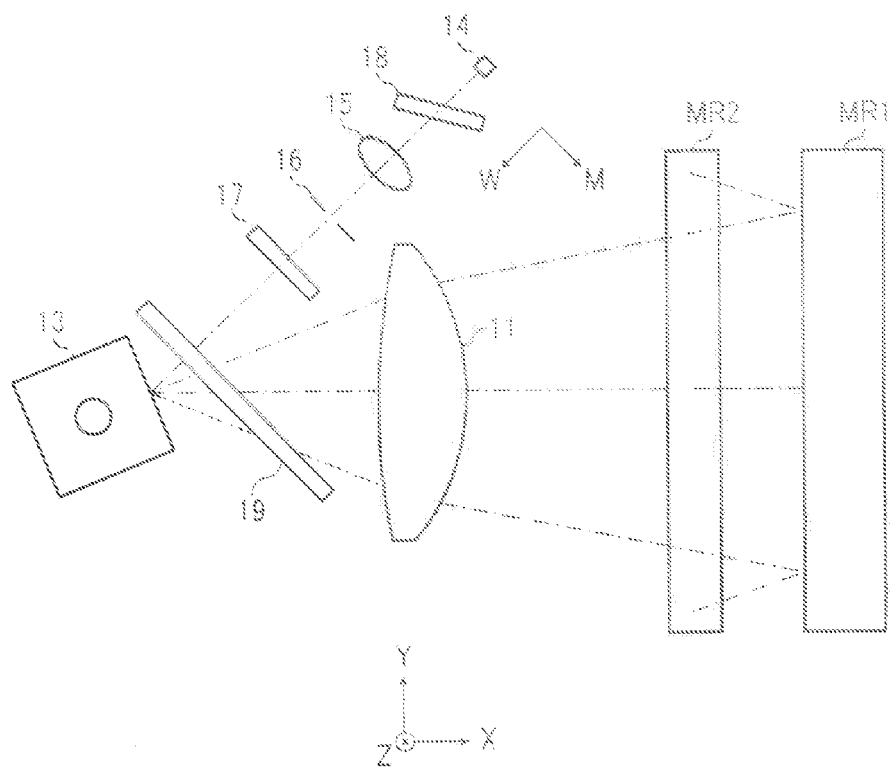
FIG. 20 is a schematic for explaining a sixth exemplary configuration of the optical scanner.

A sixth exemplary configuration includes, as illustrated as an example in FIG. 20, a sound insulating glass 19 is disposed on the optical path between the cylindrical lens 17 and the polygon mirror 13 and on the optical path between the polygon mirror 13 and the scanning lens 11 in addition to the second exemplary configuration.

In this example, a sheet having a function of a one-eighth-wave plate is pasted on the surface of the sound insulating glass 19 facing the polygon mirror 13.

In this configuration, the linearly polarized light output from the light source 14 is converted by the quarter-wave plate 18 into circularly polarized light, and is further converted into elliptically polarized light after passing through the sound insulating glass 19. The elliptically polarized light reflected (deflected) on the polygon mirror 13 is converted into linearly polarized light again after passing through the sound insulating glass 19 for the second time. The linearly polarized light then becomes incident on the scanning lens 11. In this manner, the effect of the birefringence of the scanning lens 11 can be further reduced in comparison with the second exemplary configuration.

Alternatively, a sheet having a function of quarter-wave plate may be pasted only on the part of the sound insulating glass 19 located on the optical path between the cylindrical lens 17 and the polygon mirror 13.

Alternatively, a sheet having a function of quarter-wave plate may be pasted only on the part of the sound insulating glass located on the optical path between the polygon mirror 13 and the scanning lens 11.

Figure 21:
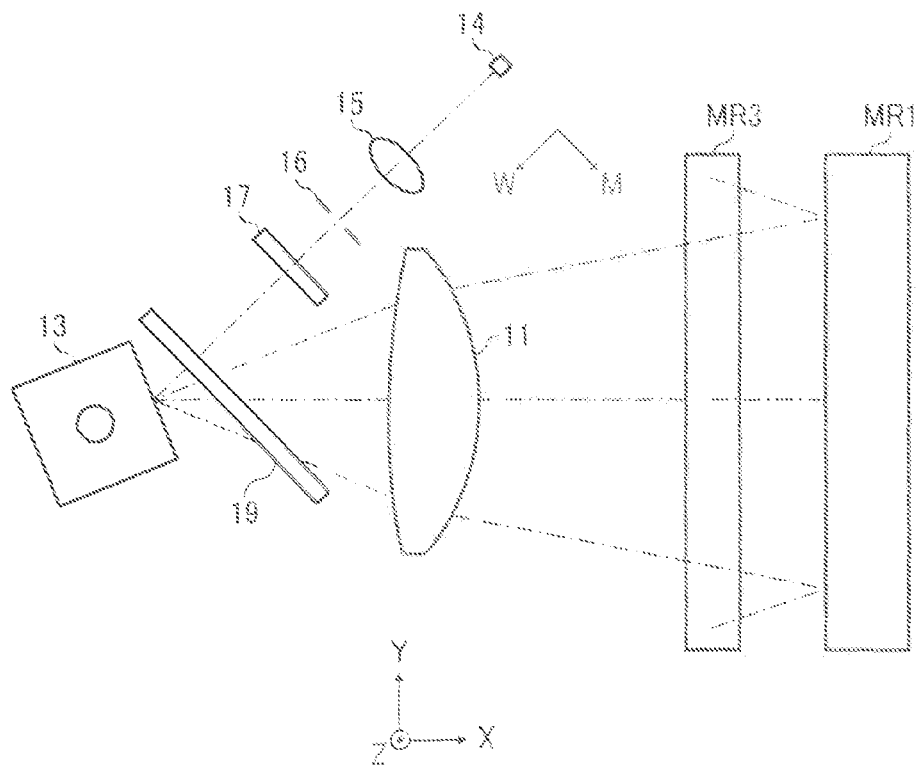
FIG. 21 is a first schematic for explaining a seventh exemplary configuration of the optical scanner.
Figure 22:
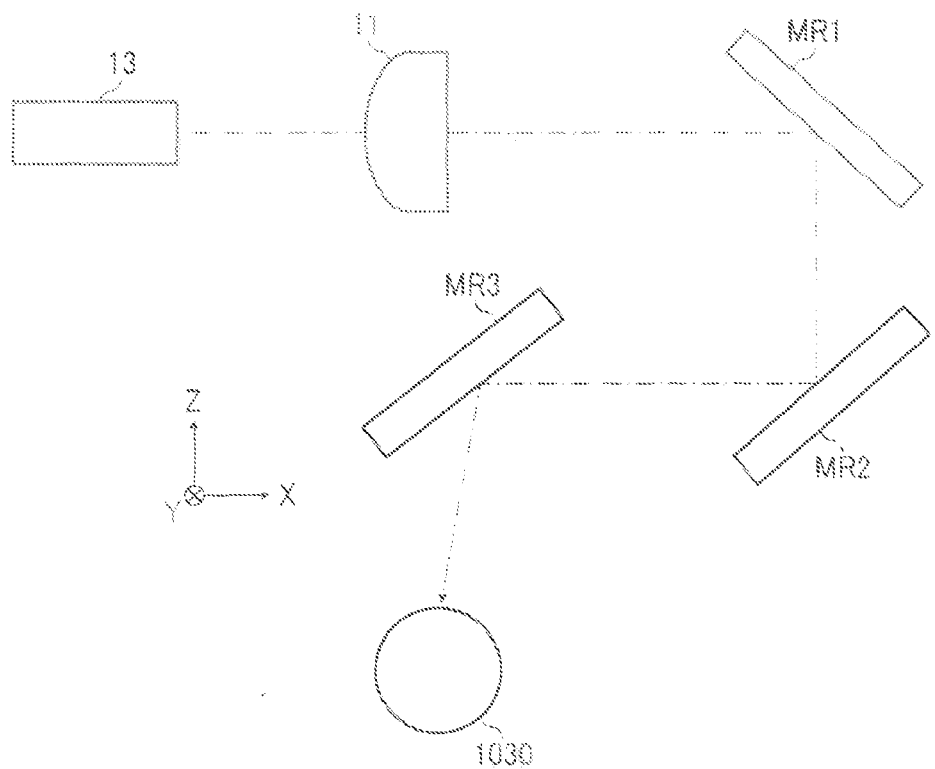
FIG. 22 is a second schematic for explaining the seventh exemplary configuration of the optical scanner.

In a seventh exemplary configuration, the optical scanner 1010 includes, as illustrated in FIGS. 21 and 22, the light source 14, the coupling lens 15, the aperture plate 16, the cylindrical lens 17, the polygon mirror 13, the sound insulating glass 19, the scanning lens 11, the three folding mirrors (MR1, MR2, and MR3), and the scanning control device (not illustrated), and these elements are fixed at predetermined positions in the optical housing (not illustrated).

The pre-deflector optical system includes the coupling lens 15, the aperture plate 16, and the cylindrical lens 17. The scanning optical system includes the resin scanning lens 11 and the three folding mirrors (MR1, MR2, and MR3).

Figure 23:
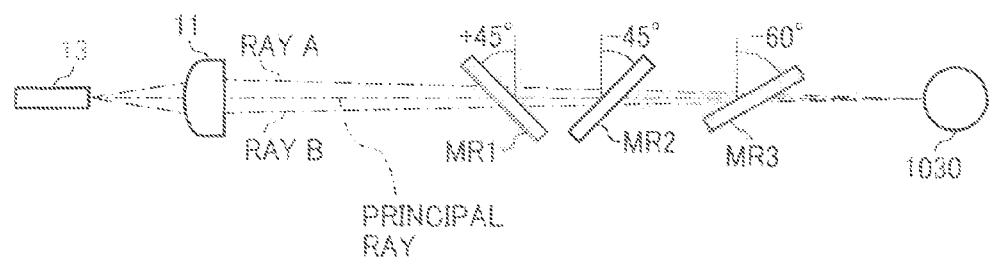
FIG. 23 is a development diagram of the scanning optical system in the seventh exemplary configuration.

The folding mirror MR1 is arranged to incline by approximately 45 degrees with reference to a plane perpendicular to the principal ray, the folding mirror MR2 is arranged to incline by approximately −45 degrees, and the folding mirror MR3 is arranged to incline by approximately −60 degrees (see FIG. 23).

In this configuration, the number of folding mirrors with the "β+" inclination angle property is one, the number of folding mirrors with the "β−" inclination angle property is two, the number of glass sheets with the "β+" inclination angle property is zero, and the number of glass sheets with the "β−" inclination angle property is zero.

Therefore, the relationship {(the number of folding mirrors with the "β+" inclination angle property)+(the number of glass sheets with the "β−" inclination angle property)}<{(the number of folding mirrors with the "β−" inclination angle property)+(the number of glass sheets with the "β+" inclination angle property)} is satisfied.

Each of the folding mirrors has a glass sheet coated with aluminum film. The aluminum film of each of the folding mirror MR1 and the folding mirror MR2 is coated with a single layer of SiO film. The aluminum film of the folding mirror MR3 is coated with multiple layers of SiO and MgF films.

In this manner, the difference between the reflectance of the p polarized component and the reflectance of the s polarized component on the folding mirror MR3 is kept smaller than the differences between the reflectance of the p polarized component and the reflectance of the s polarized component on the folding mirror MR1 and the folding mirror MR2.

Therefore, even if the uneven birefringence distribution of the scanning lens causes the polarizations of light beams arriving at the photosensitive element 1030 to vary greatly depending on where the light beam is incident on the photosensitive element 1030 in the main-scanning direction (e.g., even if both linearly polarized light beam and circularly polarized light beam travel to the photosensitive element, each arriving at a different scanning position corresponding thereto), the difference in the reflectance caused by the different polarizations is almost completely cancelled out between the folding mirror MR1 and the folding mirror MR2.

Because the difference between the reflectance of the p polarized component and the reflectance of the s polarized component on the folding mirror MR3 is small, variations of the light utilization efficiency among different scanning positions can be kept small.

In an eighth exemplary configuration, the optical scanner 1010 includes the light source 14, the coupling lens 15, the aperture plate 16, the cylindrical lens 17, the polygon mirror 13, the sound insulating glass 19, the scanning lens 11, the three folding mirrors (MR1, MR2, and MR3), and the scanning control device in the same manner as in the seventh exemplary configuration.

The folding mirror MR1 is arranged to incline by approximately 45 degrees with reference to a plane perpendicular to the principal ray, the folding mirror MR2 is arranged to incline by approximately −45 degrees, and the folding mirror MR3 is arranged to incline by approximately −60 degrees.

In this configuration, the number of folding mirrors with the "β+" inclination angle property is one, the number of folding mirrors with the "β−" inclination angle property is two, the number of glass sheets with the "β+" inclination angle property is zero, and the number of glass sheets with the "β−" inclination angle property is zero.

Therefore, the relationship {(the number of folding mirrors with the "β+" inclination angle property)+(the number of glass sheets with the "β−" inclination angle property)}<{(the number of folding mirrors with the "β−" inclination angle property)+(the number of glass sheets with the "β+" inclination angle property)} is satisfied.

Each of the folding mirrors has a glass sheet coated with aluminum film. The aluminum film of the folding mirror MR1 is coated with a single layer of SiO film. The aluminum film of each of the folding mirror MR2 and the folding mirror MR3 is coated with multiple layers of SiO and MgF films.

In this manner, the difference between the reflectance of the p polarized component and the reflectance of the s polarized component on the folding mirror MR1 is kept larger than the differences between the reflectance of the p polarized component and the reflectance of the s polarized component on the folding mirror MR2 and the folding mirror MR3.

Therefore, even if the uneven birefringence distribution of the scanning lens causes the polarizations of light beams arriving at the photosensitive element to vary greatly depending on where the light beam is incident on the photosensitive element in the main-scanning direction (e.g., even if both linearly polarized light beam and circularly polarized light beam travel to the photosensitive element, each arriving at a different scanning position corresponding thereto), a change in the reflectance on the folding mirror MR1 caused by the different polarizations is almost completely cancelled out by the folding mirror MR2 and the folding mirror MR3.

Figure 24:
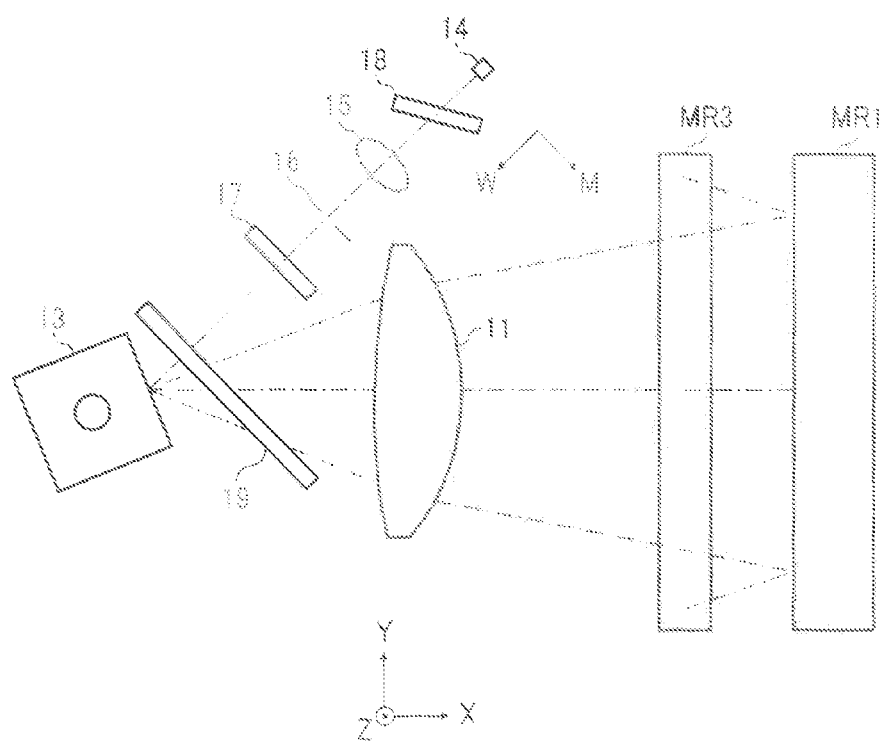
FIG. 24 is a first schematic for explaining a ninth exemplary configuration of the optical scanner.
Figure 25:
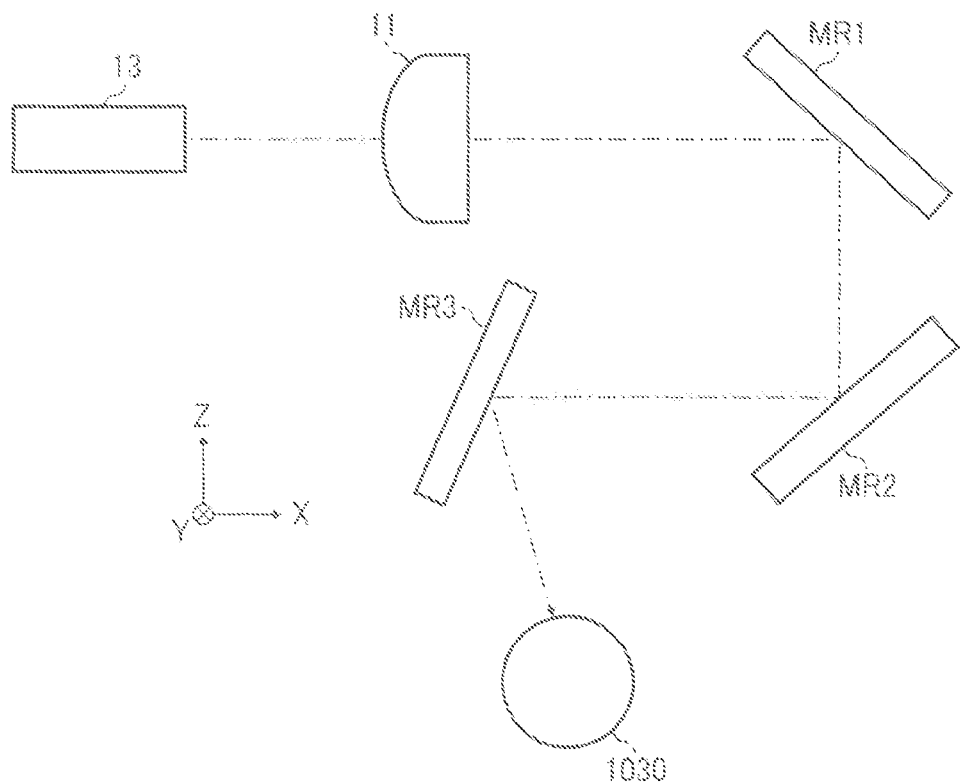
FIG. 25 is a second schematic for explaining the ninth exemplary configuration of the optical scanner.

In a ninth exemplary configuration, the optical scanner 1010 includes, as illustrated in FIGS. 24 and 25, the light source 14, the quarter-wave plate 18, the coupling lens 15, the aperture plate 16, the cylindrical lens 17, the polygon mirror 13, the sound insulating glass 19, the scanning lens 11, the three folding mirrors (MR1, MR2, and MR3), and the scanning control device (not illustrated), and these elements are fixed at predetermined positions in the optical housing (not illustrated).

The pre-deflector optical system includes the quarter-wave plate 18, the coupling lens 15, the aperture plate 16, and the cylindrical lens 17. The scanning optical system includes the resin scanning lens 11 and the three folding mirrors (MR1, MR2, and MR3).

The quarter-wave plate 18 is disposed on the optical path between the light source 14 and the coupling lens 15.

The linearly polarized light output from the light source 14 is converted into circularly polarized light after passing through the quarter-wave plate 18, and further converted into elliptically polarized light after passing through the scanning lens 11.

Figure 26:
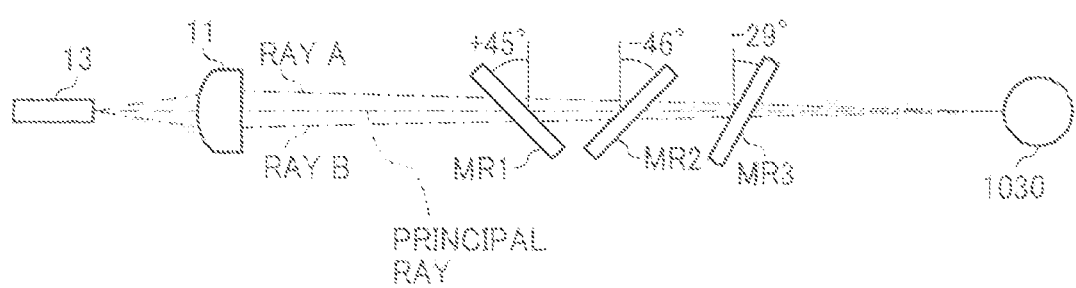
FIG. 26 is a development diagram of the scanning optical system in the ninth exemplary configuration.

The folding mirror MR1 is arranged to incline by approximately 45 degrees with reference to a plane perpendicular to the principal ray, the folding mirror MR2 is arranged to incline by approximately −46 degrees, and the folding mirror MR3 is arranged to incline by approximately −29 degrees (see FIG. 26).

In this configuration, the number of folding mirrors with the "β+" inclination angle property is one, the number of folding mirrors with the "β−" inclination angle property is two, the number of glass sheets with the "β+" inclination angle property is one, and the number of glass sheets with the "β−" inclination angle property is zero.

Therefore, the relationship {(the number of folding mirrors with the "β+" inclination angle property)+(the number of glass sheets with the "β−" inclination angle property)}<{(the number of folding mirrors with the "β−" inclination angle property)+(the number of glass sheets with the "β+" inclination angle property)} is satisfied.

Each of the folding mirrors has a glass sheet coated with aluminum film. The aluminum film of each of the folding mirror MR1 and the folding mirror MR2 is coated with a single layer of SiO film. The aluminum film in the folding mirror MR3 is coated with multiple layers of SiO and MgF films.

In this manner, the difference between the reflectance of the p polarized component and the reflectance of the s polarized component on the folding mirror MR3 is kept smaller than the differences between the reflectance of the p polarized component and the reflectance of the s polarized component on the folding mirror MR1 and the folding mirror MR2.

If the linearly polarized light output from the light source 14 is reflected on the coupling lens 15 and so on to return to the light source 14, and gets inside of the resonator in the light-emitting element, the optical output of the light-emitting element becomes unstable, and such instability becomes a cause of an uneven density. In this configuration, the quarter-wave plate 18 disposed immediately after the light source 14 prevents the light returning to the light source 14 from destabilizing the optical output of the light-emitting element.

However, with a quarter-wave plate, the light becomes more sensitive to the effect of the birefringence distribution of the scanning lens. Therefore, it is preferable that the following formulas (21) to (24) be satisfied when a quarter-wave plate is used together with a surface emitting laser.

$$|\theta m1|-(|\theta m2|+|\theta m3|)<|\theta m1| \qquad (21)$$

$$|\theta m1|-(|\theta m2|+|\theta m3|)<|\theta m2| \qquad (22)$$

$$|\theta m1|-(|\theta m2|+|\theta m3|)<|\theta m3| \qquad (23)$$

$$-15 \leq |\theta m1|-(|\theta m2|+|\theta m3|) \leq 15 \qquad (24)$$

In this manner, the same advantageous effects of the seventh exemplary configuration can be achieved.

In addition, if each of the folding mirrors is applied with the same coating as those in the eighth exemplary configuration, the same advantageous effects of the eighth exemplary configuration can also be achieved.

Figure 27:
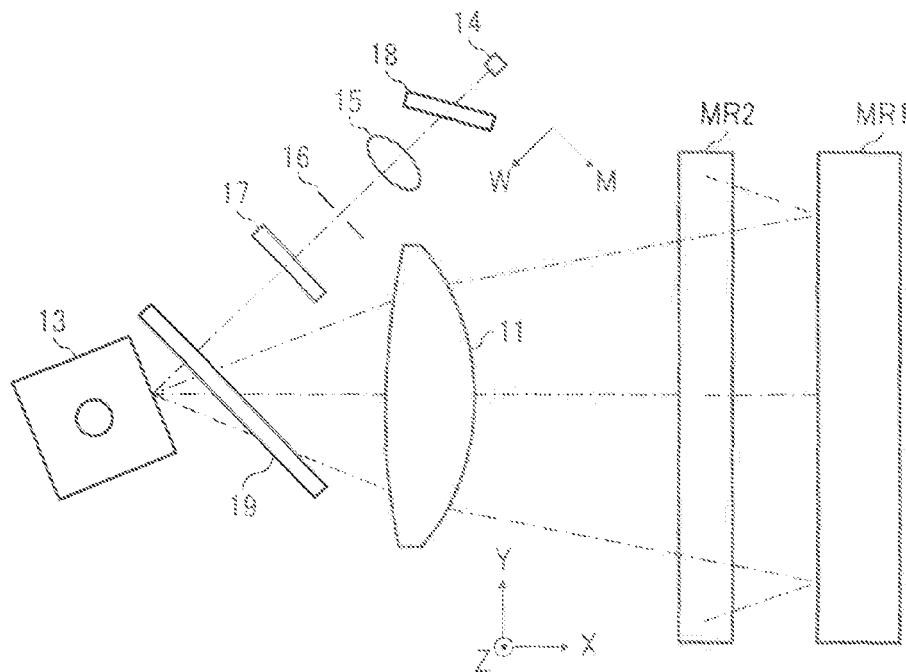
FIG. 27 is a first schematic for explaining a tenth exemplary configuration of the optical scanner.
Figure 28:
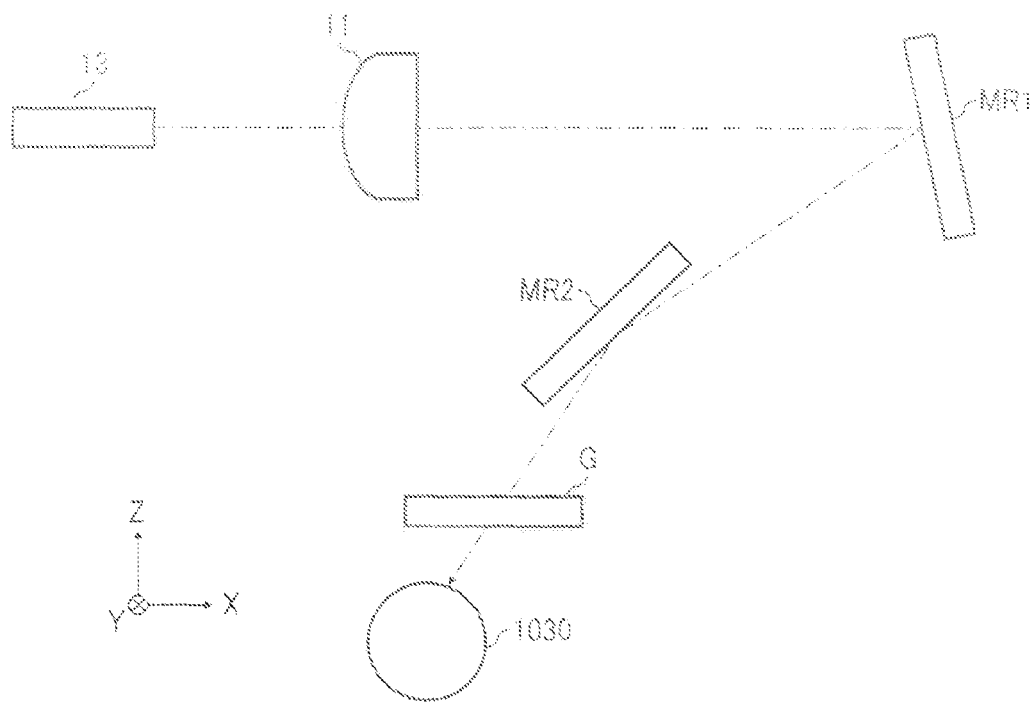
FIG. 28 is a second schematic for explaining the tenth exemplary configuration of the optical scanner.

In a tenth exemplary configuration, the optical scanner 1010 includes, as illustrated in FIGS. 27 and 28, the light source 14, the quarter-wave plate 18, the coupling lens 15, the aperture plate 16, the cylindrical lens 17, the polygon mirror 13, the sound insulating glass 19, the scanning lens 11, the two folding mirrors (MR1 and MR2), the dust prevention glass G, and the scanning control device (not illustrated), and these elements are fixed at predetermined positions in the optical housing (not illustrated).

The pre-deflector optical system includes the quarter-wave plate 18, the coupling lens 15, the aperture plate 16, and the cylindrical lens 17. The scanning optical system includes the resin scanning lens 11 and the two folding mirrors (MR1 and MR2).

Figure 29:
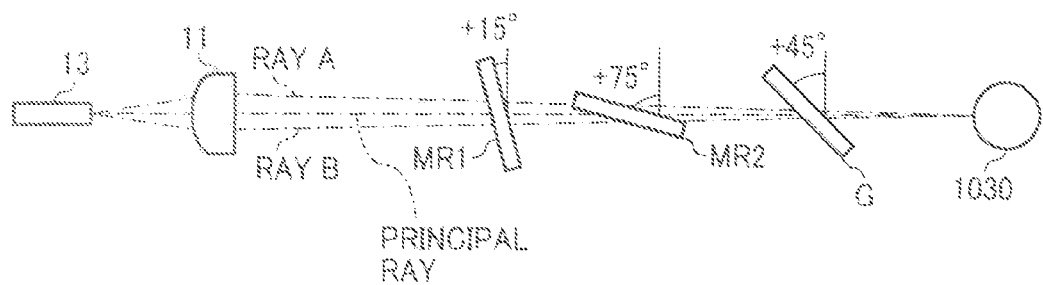
FIG. 29 is a development diagram of the scanning optical system in the tenth exemplary configuration.

The folding mirror MR1 is arranged to incline by approximately +15 degrees with reference to a plane perpendicular to the principal ray, the folding mirror MR2 is arranged to incline by approximately +75 degrees, and the dust prevention glass G is arranged to incline by approximately +45 degrees (see FIG. 29).

Each of the folding mirrors has a glass sheet coated with aluminum film. The aluminum film in the folding mirror MR1 is coated with multiple layers of SiO and MgF films. The aluminum film of the folding mirror MR2 is coated with a single layer of SiO film. The dust prevention glass G is coated with a single layer of SiO film as well.

In this manner, the difference between the reflectance of the p polarized component and the reflectance of the s polarized component on the folding mirror MR1 is kept smaller than the difference between the reflectance of the p polarized component and the reflectance of the s polarized component on the folding mirror MR2. In addition, the difference between the reflectance of the p polarized component and the reflectance of the s polarized component on the folding mirror MR1 is kept smaller than the difference between the transmittance of the p polarized component and the transmittance of the s polarized component on the dust prevention glass G.

Here, $\Sigma|\theta m1|=90$, $\Sigma|\theta m2|=0$, $2\Sigma|\theta g1|=90$, and $2\Sigma|\theta g2|=0$, and the absolute value of $(\Sigma|\theta m1|-\Sigma|\theta m2|-2\Sigma|\theta g1|+2\Sigma|\theta g2|)$ is zero, which is smaller than any one of $|\theta m1|$ and $2|\theta g1|$.

Furthermore, the absolute value of $(\Sigma|\theta m1|-\Sigma|\theta m2|-2\Sigma|\theta g1|+2\Sigma|\theta g2|)$ is equal to or less than 15.

In this example, the deviation in the reflectance on the folding mirror MR2 with a large angle of incidence is cancelled out by the deviation in the transmittance on the first surface and the deviation in the transmittance on the second surface of the dust prevention glass G whose angle of incidence is relatively small.

The difference between the reflectance of the p polarized component and the reflectance of s polarized component is small on the folding mirror MR1 with a relatively small angle of incidence.

In this manner, variations of the light utilization efficiency among different scanning positions caused by the uneven birefringence distribution of the scanning lens can be suppressed.

In an eleventh exemplary configuration, the optical scanner 1010 includes the light source 14, the quarter-wave plate 18, the coupling lens 15, the aperture plate 16, the cylindrical lens 17, the polygon mirror 13, the sound insulating glass 19, the scanning lens 11, the two folding mirrors (MR1 and MR2), the dust prevention glass G, and the scanning control device in the same manner as in the tenth exemplary configuration.

The folding mirror MR1 is arranged to incline by approximately +30 degrees with reference to a plane perpendicular to the principal ray, the folding mirror MR2 is arranged to incline by approximately −30 degrees, and the dust prevention glass G is arranged to incline by approximately −30 degrees.

Each of the folding mirrors has a glass sheet coated with aluminum film. The aluminum film in each of the folding mirror MR1 and the folding mirror MR2 is coated with multiple layers of SiO and MgF films. The aluminum film of the dust prevention glass G is coated with a single layer of SiO film.

In this manner, the difference between the transmittance of the p polarized component and the transmittance of the s polarized component on the dust prevention glass G is kept larger than the differences between the reflectance of the p polarized component and the reflectance of the s polarized component on the folding mirror MR1 and the folding mirror MR2.

Thus, the reflectance deviations on the folding mirror MR1 and the folding mirror MR2 (approximately a half of that caused in the tenth exemplary configuration) can be cancelled out by the transmittance deviation on the two surfaces of the dust prevention glass G.

Two folding mirrors (MR3 and MR4) each having aluminum film coated with multiple layers of SiO and MgF films, as well as having the "β−" inclination angle property, may be added to the scanning optical system.

In such a configuration, the relationship {(the number of folding mirrors with the "β+" inclination angle property)+(the number of glass sheets with the "β−" inclination angle property)}<{(the number of folding mirrors with the "β−" inclination angle property)+(the number of glass sheets with the "β+" inclination angle property)} is satisfied.

Figure 30:
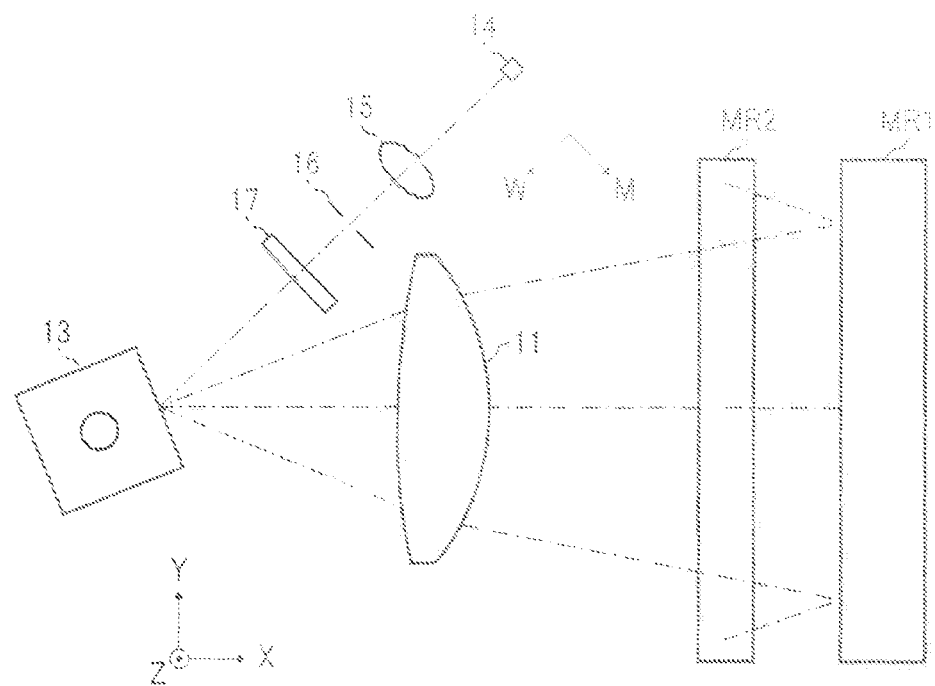
FIG. 30 is a first schematic for explaining a twelfth exemplary configuration of the optical scanner.
Figure 31:
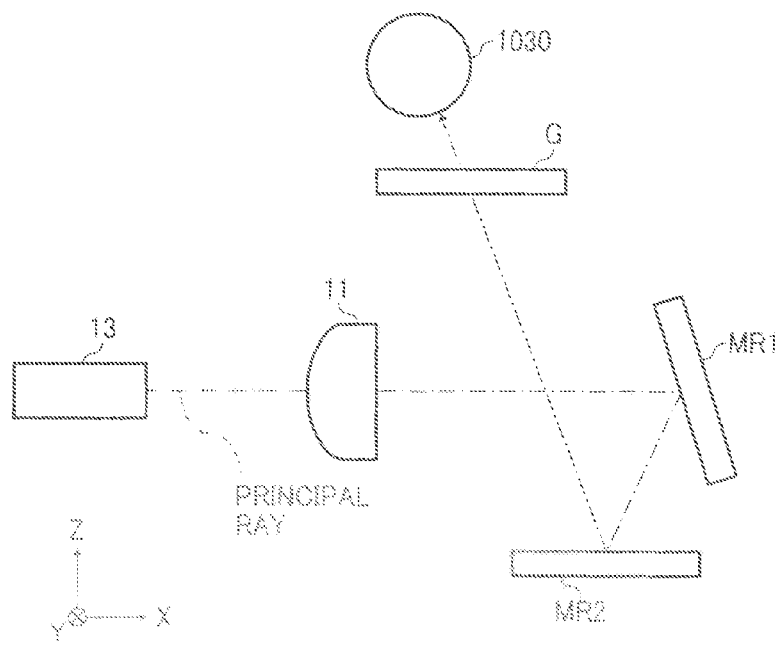
FIG. 31 is a second schematic for explaining the twelfth exemplary configuration of the optical scanner.

In a twelfth exemplary configuration, the optical scanner 1010 includes, as illustrated in FIGS. 30 and 31, the light source 14, the coupling lens 15, the aperture plate 16, the cylindrical lens 17, the polygon mirror 13, the scanning lens 11, the two folding mirrors (MR1 and MR2), the dust prevention glass G, and the scanning control device (not illustrated), and these elements are fixed at predetermined positions in the optical housing (not illustrated).

The pre-deflector optical system includes the coupling lens 15, the aperture plate 16, and the cylindrical lens 17. The scanning optical system includes the resin scanning lens 11 and the two folding mirrors (MR1 and MR2).

Figure 32:
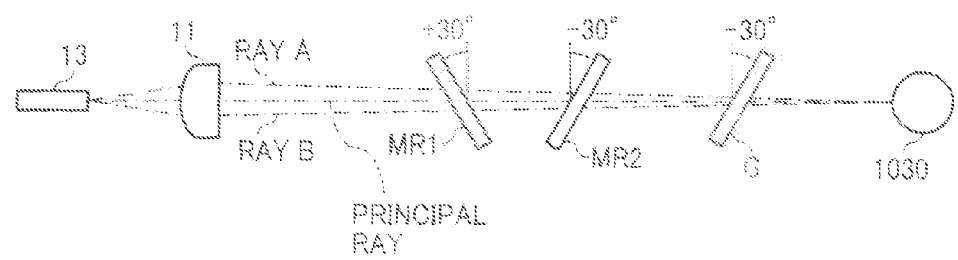
FIG. 32 is a development diagram of the scanning optical system in the twelfth exemplary configuration.

The folding mirror MR1 is arranged to incline by approximately +30 degrees with reference to a plane perpendicular to the principal ray, the folding mirror MR2 is arranged to incline by approximately −30 degrees, and the dust prevention glass G is arranged to incline by −30 degrees (see FIG. 32).

Each of the folding mirrors has a glass sheet having a coat of aluminum film. The aluminum film of the folding mirror MR1 is coated with multiple layers of SiO and MgF films. The aluminum film of the folding mirror MR2 is coated with a single layer of SiO film. The dust prevention glass G is coated with multiple layers of SiO and MgF films.

In this configuration, the reflectance deviation on the folding mirror MR1 and the transmittance deviation on the dust prevention glass G are kept small by coating of the multiple layers of the film. Slight deviations that occur can be cancelled out by the reflectance deviation on the folding mirror MR2.

However, in this configuration, $\Sigma|\theta m1|=30$, $\Sigma|\theta m2|=30$, $2\Sigma|\theta g1|=0$, $2\Sigma|\theta g2|=60$, and the absolute value of $(\Sigma|\theta m1|-\Sigma|\theta m2|-2\Sigma|\theta g1|+2\Sigma|\theta g2|)$ is 60. In other words, the absolute value of $(\Sigma|\theta m1|-\Sigma|\theta m2|-2\Sigma|\theta g1|+2\Sigma|\theta g2|)$ is not equal to or less than 15. Therefore, if the quarter-wave plate 18 is arranged on the optical path between the light source 14 and the coupling lens 15, it might be impossible to keep the variations in the light utilization efficiency small.

Figure 33:
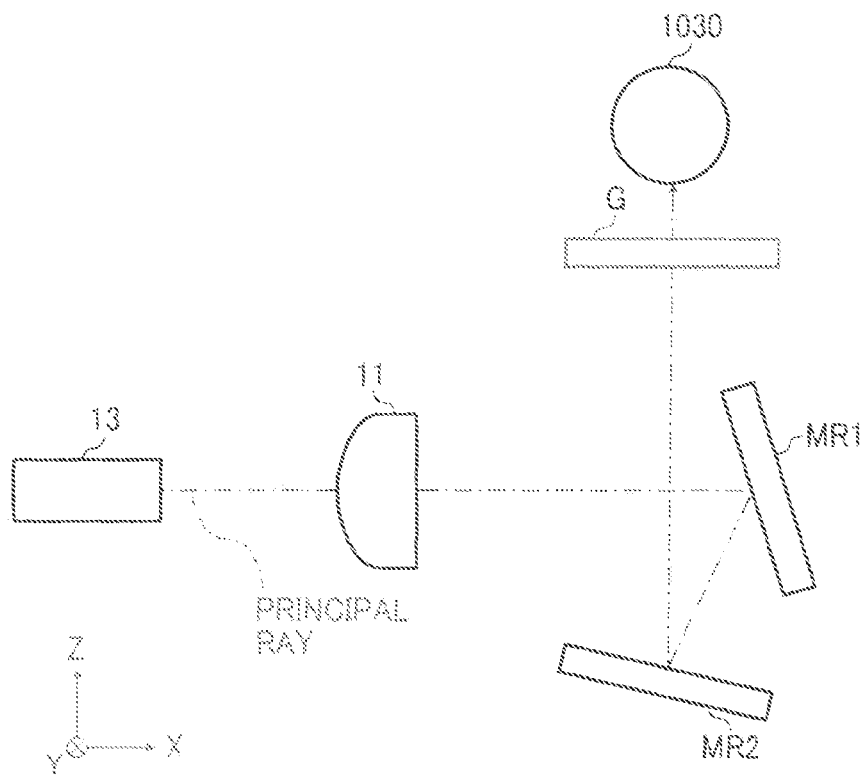
FIG. 33 is a schematic for explaining a thirteenth exemplary configuration of the optical scanner.
Figure 34:
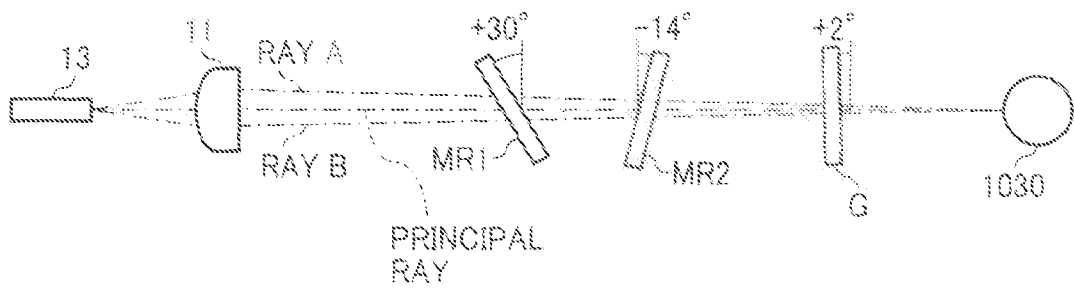
FIG. 34 is a development diagram of the scanning optical system in the thirteenth exemplary configuration.

In a thirteenth exemplary configuration, the folding mirror MR1 is arranged to incline by approximately +30 degrees with reference to a plane perpendicular to the principal ray, the folding mirror MR2 is arranged to incline by approximately −14 degrees, and the dust prevention glass G is arranged to incline by approximately +2 degrees in the twelfth exemplary configuration (see FIGS. 33 and 34).

In this configuration, the number of folding mirrors with the "β+" inclination angle property is one, the number of folding mirrors with the "β−" inclination angle property is one, the number of glass sheets with the "β+" inclination angle property is one, and the number of glass sheets with the "β−" inclination angle property is zero.

Therefore, the relationship {(the number of folding mirrors with the "β+" inclination angle property)+(the number of glass sheets with the "β−" inclination angle property)}<{(the number of folding mirrors with the "β−" inclination angle property)+(the number of glass sheets with the "β+" inclination angle property)} is satisfied.

Each of the folding mirrors has a glass sheet having a coat of aluminum film. The aluminum film of the folding mirror MR1 is coated with a single layer of SiO film. The aluminum film of the folding mirror MR2 is coated with multiple layers of SiO and MgF films. The dust prevention glass G is coated with multiple layers of SiO and MgF films as well.

In this manner, the difference between the reflectance of the p polarized component and the reflectance of the s polarized component on the folding mirror MR1 is kept larger than the difference between the reflectance of the p polarized component and the reflectance of the s polarized component on the folding mirror MR2. Furthermore, the difference between the reflectance of the p polarized component and the reflectance of the s polarized component on the folding mirror MR1 is kept larger than the difference between the transmittance of the p polarized component and the transmittance of the s polarized component on the dust prevention glass G.

In this example, $\Sigma|\theta m1|=30$, $\Sigma|\theta m2|=14$, $2\Sigma|\theta g1|=4$, $2\Sigma|\theta g2|=0$, and the absolute value of $(\Sigma|\theta m1|-\Sigma|\theta m2|-2\Sigma|\theta g1|+2\Sigma|\theta g2|)$ is 12. In other words, the absolute value of $(\Sigma|\theta m1|-\Sigma|\theta m2|-2\Sigma|\theta g1|+2\Sigma|\theta g2|)$ is equal to or less than 15.

Therefore, even if the quarter-wave plate 18 is disposed on the optical path between the light source 14 and the coupling lens 15, the variations in light utilization efficiency can be kept small.

In this configuration, the aluminum film of the folding mirror MR1 may be coated with a single layer of SiO film, the aluminum film of the folding mirror MR2 may be coated with multiple layers of SiO and MgF films, and the dust prevention glass G may be coated with a single layer of SiO film.

In this manner, the difference between the reflectance of the p polarized component and the reflectance of the s polarized component on the folding mirror MR2 is kept smaller than the difference between the reflectance of the p polarized component and the reflectance of the s polarized component on the folding mirror MR1, and smaller than the difference between the transmittance of the p polarized component and the transmittance of the s polarized component on the dust prevention glass G.

Figure 35:
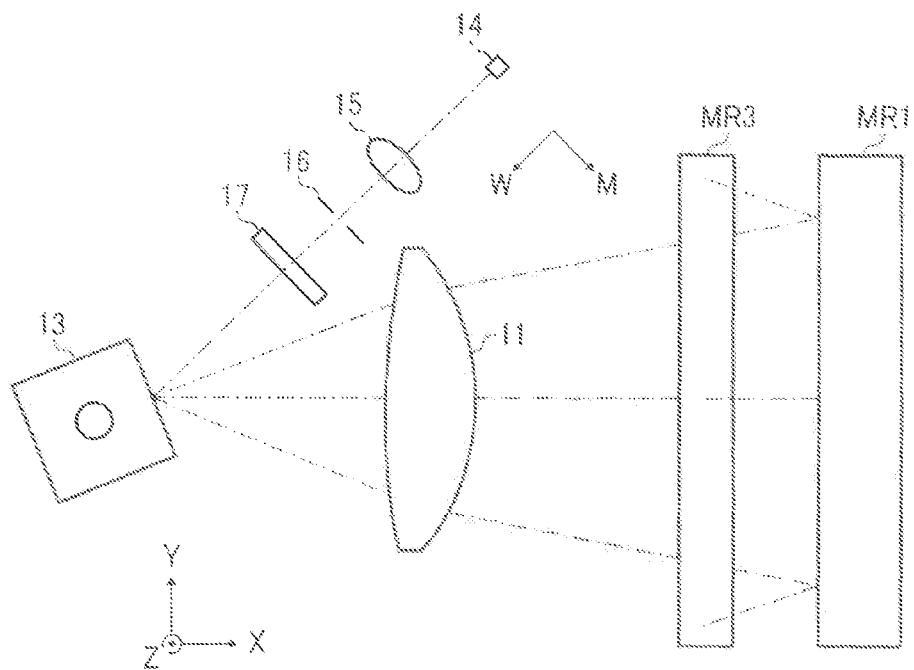
FIG. 35 is a first schematic for explaining a fourteenth exemplary configuration of the optical scanner.
Figure 36:
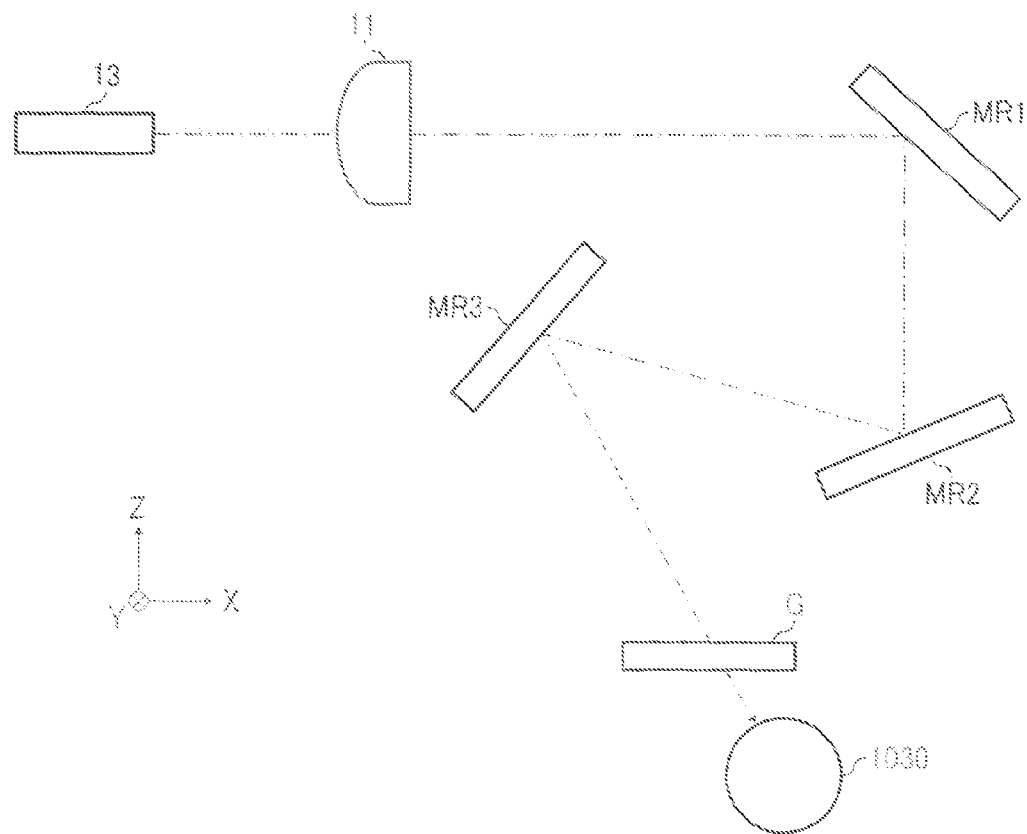
FIG. 36 is a second schematic for explaining the fourteenth exemplary configuration of the optical scanner.

In a fourteenth exemplary configuration, the optical scanner 1010 includes, as illustrated in FIGS. 35 and 36, the light source 14, the coupling lens 15, the aperture plate 16, the cylindrical lens 17, the polygon mirror 13, the scanning lens 11, the three folding mirrors (MR1, MR2, and MR3), the dust prevention glass G, and the scanning control device (not illustrated), and these elements are fixed at predetermined positions in the optical housing (not illustrated).

Figure 37:
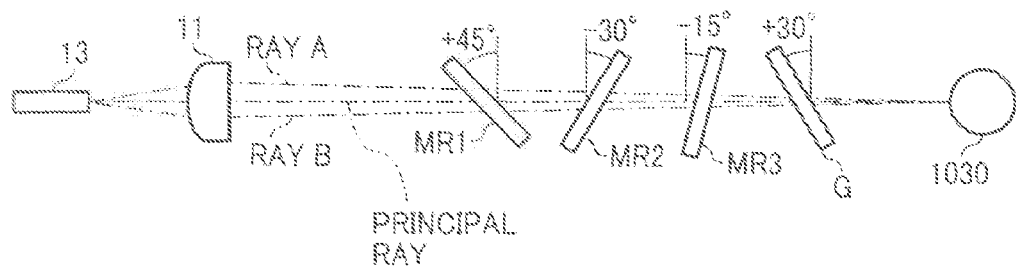
FIG. 37 is a development diagram of the scanning optical system in the fourteenth exemplary configuration.

The folding mirror MR1 is arranged to incline by approximately +45 degrees with reference to a plane perpendicular to the principal ray, the folding mirror MR2 is arranged to incline by approximately −30 degrees, the folding mirror MR3 is arranged to incline by approximately −15 degrees, and the dust prevention glass G is arranged to incline by approximately +30 degrees (see FIG. 37).

In this configuration, the number of folding mirrors with the "β+" inclination angle property is one, the number of folding mirrors with the "β−" inclination angle property is two, the number of glass sheets with the "β+" inclination angle property is one, and the number of glass sheets with the "β−" inclination angle property is zero.

Therefore, the relationship {(the number of folding mirrors with the "β+" inclination angle property)+(the number of glass sheets with the "β−" inclination angle property)}<{(the number of folding mirrors with the "β−" inclination angle property)+(the number of glass sheets with the "β+" inclination angle property)} is satisfied.

Each of the folding mirrors has a glass sheet having a coat of aluminum film. The aluminum film of each of the folding mirrors is coated with a single layer of SiO film. The dust prevention glass G is coated with multiple layers of SiO and MgF films.

In this manner, the difference between the transmittance of the p polarized component and the transmittance of the s polarized component on the dust prevention glass G is kept smaller than the difference between the reflectance of the p polarized component and the reflectance of the s polarized component on each of the folding mirrors.

The reflectance deviation on the folding mirror MR1 caused by the uneven birefringence distribution of the scanning lens 11 is cancelled out on the folding mirror MR2 and the folding mirror MR3 each with a relatively small angle of incidence. Furthermore, by keeping the difference between the transmittance of the p polarized component and the transmittance of the s polarized component on the dust prevention glass G small, the change in the light utilization efficiency caused by the birefringence can be suppressed.

In this example, $\Sigma|\theta m1|=45$, $\Sigma|\theta m2|=45$, $2\Sigma|\theta g1|=60$, and $2\Sigma|\theta g2|=0$, and the absolute value of $(\Sigma|\theta m1|-\Sigma|\theta m2|-2\Sigma|\theta g1|+2\Sigma|\theta g2|)$ is 60. In other words, the absolute value of $(\Sigma|\theta m1|-\Sigma|\theta m2|-2\Sigma|\theta g1|+2\Sigma|\theta g2|)$ is not equal to or less than 15. Therefore, if the quarter-wave plate 18 is arranged on the optical path between the light source 14 and the coupling lens 15, the variations in light utilization efficiency cannot be kept small.

As described above, the optical scanner 1010 according to the embodiment includes the light source 14, the pre-deflector optical system, the polygon mirror 13, and the scanning optical system including the resin scanning lens 11 and at least one folding mirror.

Relating to the length of the optical paths of the ray A and the ray B included in the light beam that is incident on the scanning optical system and being separated in the rotating shaft direction of the polygon mirror 13, the length being from the polygon mirror on the plane perpendicular to the main-scanning direction, when the number of folding mirrors on which the ray A is incident along a shorter optical path than the ray B is m1, the number of folding mirrors on which the ray A is incident along a longer optical path than the ray B is m2, the number of glass sheets on which the ray A is incident along a shorter optical path than the ray B is g1, and the number of glass sheets on which the ray A is incident along a longer optical path than the ray B is g2, a relationship m1+g2=m2+g1 or a relationship m1+g2<m2+g1 is satisfied, and when the relationship m1+g2<m2+g1 is satisfied, an optical property of one of the folding mirrors and the glass sheets is defined so as to be different from the optical properties of the other optical elements.

When the relationship m1+g2<m2+g1 is satisfied, a plurality of folding mirrors are included in the scanning optical system, and the difference between the reflectance of the p polarized component and the reflectance of the s polarized component on the folding mirror to which the ray A has a shorter optical path than the ray B is kept larger than the difference(s) between the reflectance of the p polarized component and the reflectance of the s polarized component of the other folding mirror(s).

Alternatively, when the relationship m1+g2<m2+g1 is satisfied, a plurality of folding mirrors and a glass sheet are included in the scanning optical system, and the difference between the reflectance of the p polarized component and the reflectance of the s polarized component on the folding mirror to which the ray A has a shorter optical path than the ray B is kept larger than the difference(s) between the reflectance of the p polarized component and the reflectance of the s polarized component on the other folding mirror(s), and is kept larger than the difference between the transmittance of the p polarized component and the transmittance of the s polarized component on the glass sheet.

Alternatively, when the relationship m1+g2<m2+g1 is satisfied, at least one folding mirror and a glass sheet are included in the scanning optical system, and the difference between the transmittance of the p polarized component and the transmittance of the s polarized component on the glass sheet to which the ray A has a shorter optical path than the ray B is kept smaller than the difference(s) between the reflectance of the p polarized component and the reflectance of the s polarized component on the folding mirror(s).

Alternatively, when the relationship m1+g2<m2+g1 is satisfied, a plurality of folding mirrors are included in the scanning optical system, and the difference between the reflectance of the p polarized component and the reflectance of the s polarized component on the folding mirror to which the ray A has a longer optical path than the ray B is kept smaller than the difference(s) between the reflectance of the p polarized component and the reflectance of the s polarized component on the other folding mirror(s).

Alternatively, when the relationship m1+g2<m2+g1 is satisfied, a plurality of folding mirrors and a glass sheet are included in the scanning optical system, the difference between the reflectance of the p polarized component and the reflectance of the s polarized component on the folding mirror to which the ray A has a longer optical path than the ray B is kept smaller than the difference(s) between the reflectance of the p polarized component and the reflectance of the s polarized component on the other folding mirror(s), and is kept smaller than the difference between the transmittance of the p polarized component and the transmittance of the s polarized component on the glass sheet.

Alternatively, when the relationship m1+g2<m2+g1 is satisfied, at least one folding mirror and a glass sheet are included in the scanning optical system, and the difference between the transmittance of the p polarized component and the transmittance of the s polarized component on the glass sheet to which the ray A has a longer optical path than the ray B is kept larger than the difference(s) between the reflectance of the p polarized component and the reflectance of the s polarized component on the folding mirror(s).

When a quarter-wave plate is placed between the light source and the coupling lens, and a plurality of folding mirrors are arranged between the resin scanning lens 11 and the photosensitive element, the absolute value of ($\Sigma|\theta m1|-\Sigma|\theta m2|$) is made smaller than any one of $|\theta m1|$ and $|\theta m2|$, and is a value equal to or less than 15.

When a quarter-wave plate is placed between the light source and the coupling lens, and at least one folding mirror and a glass sheet are disposed between the resin scanning lens 11 and the photosensitive element, the absolute value of ($\Sigma|\theta m1|-\Sigma|\theta m2|-2\Sigma|\theta g1|+2\Sigma|\theta g2|$) is made smaller than any one of $|\theta m1|$, $|\theta m2|$, $2|\theta g1|$, and $2|\theta g2|$, and a value equal to or less than 15.

In these configurations, even if the optical scanner 1010 has a multi-beam light source and a plastic-molded scanning lens, highly precise optical scanning can be performed.

The laser printer 1000 according to the embodiment includes the optical scanner 1010. Therefore, costs can be reduced without deteriorating image quality.

According to the embodiment explained above, the light source 14 has forty light-emitting elements. However, the present invention is not limited thereto.

Furthermore, in the embodiment, fourteen exemplary configurations of the optical scanner 1010 are explained. However, the present invention is not limited thereto.

Furthermore, according to the embodiment, the image forming apparatus is explained to be the laser printer 1000. However, the present invention is not limited thereto.

For example, the optical scanner 1010 may be used in an image forming apparatus that directly irradiates a medium (for example, a sheet) colored by a laser beam with a laser beam.

Alternatively, the optical scanner 1010 may be used in an image forming apparatus using a silver-halide film as an image carrier. In such a structure, optical scanning forms a latent image on the silver-halide film. Such a latent image can be visualized by a process equivalent to a development process in the usual silver-halide photographic process, and transferred onto a printing paper by a process equivalent to a printing process in the usual silver-halide photographic process. Such an image forming apparatus may also be realized as an optical print making apparatus or an optical drawing apparatus for drawing a computed tomography (CT) scan image, for example.

The optical scanner 1010 is also suited for image forming apparatuses other than a printer, such as a copying machine, a facsimile, or a multifunction product (MFP) including these functions.

Figure 38:
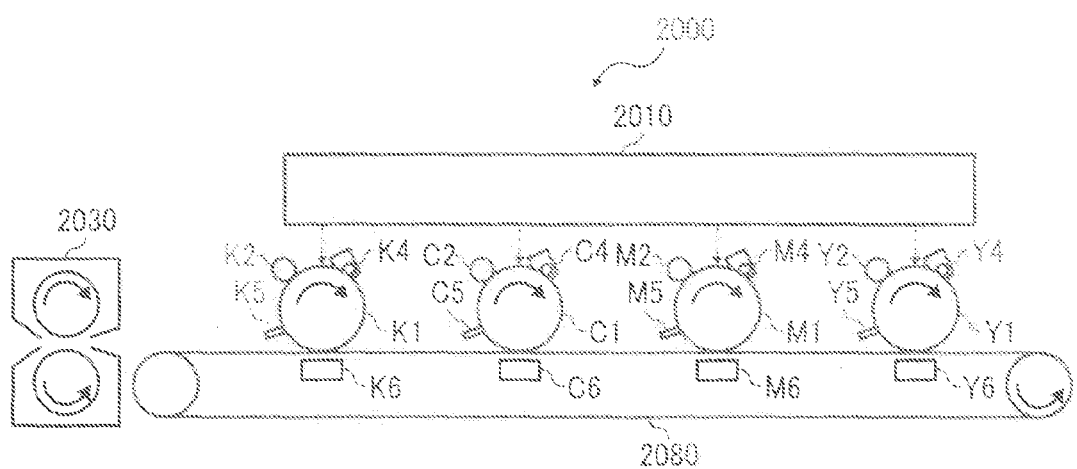
FIG. 38 is a schematic of a general structure of a color printer.
Figure 39A:
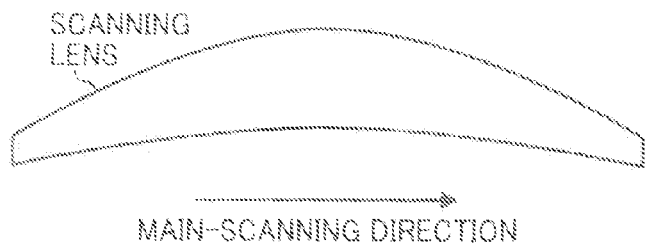
FIGS. 39A to 39C are schematics for explaining examples of uneven birefringence in a plastic-molded scanning lens.
Figure 39B:
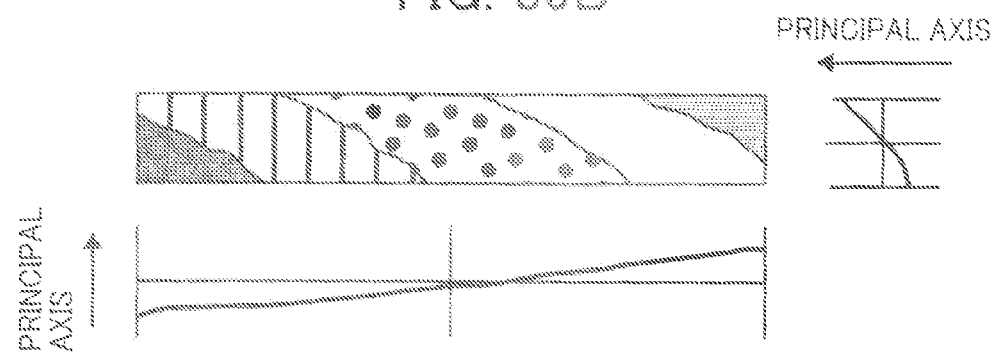
Figure 39C:
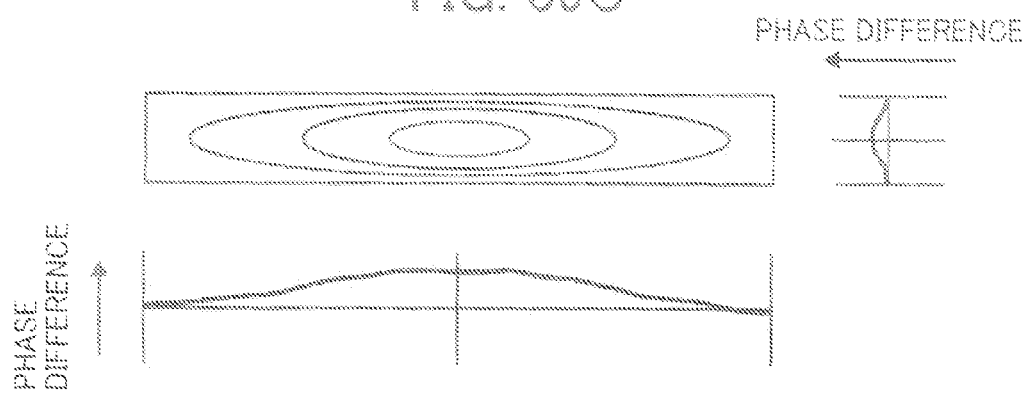
Figure 40:
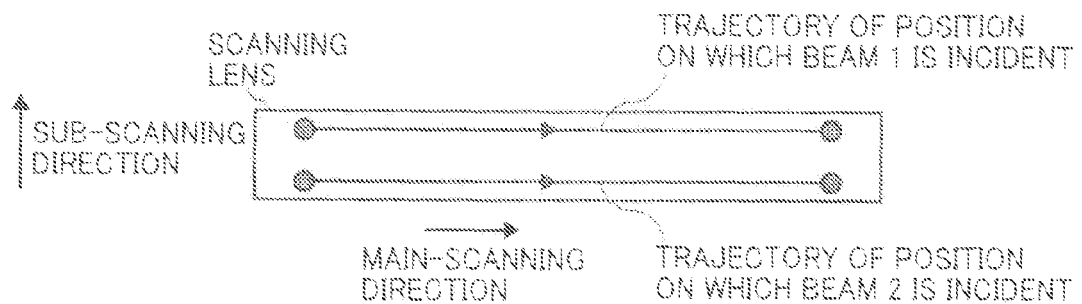
FIG. 40 is a schematic for explaining two beams incident on the plastic-molded scanning lens.
Figure 41:
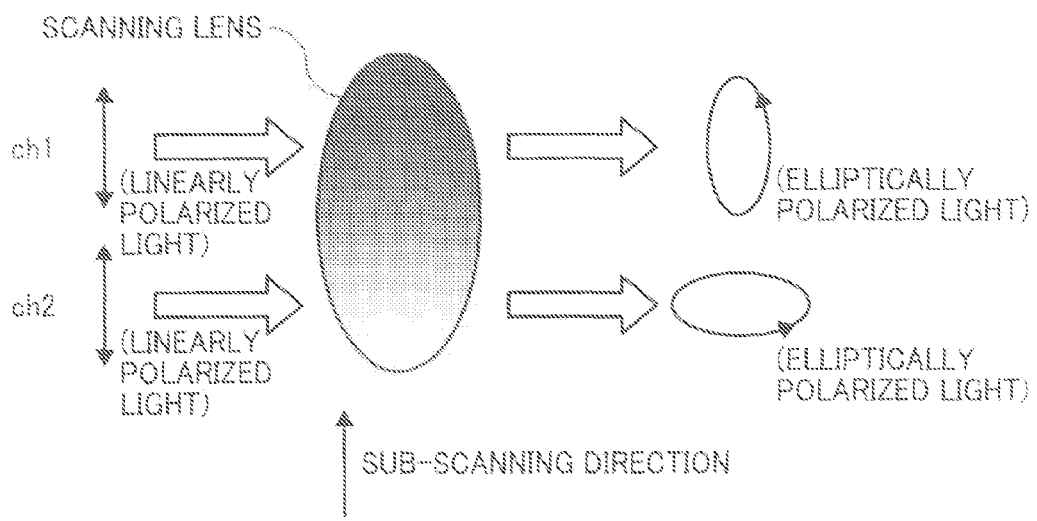
FIG. 41 is a schematic for explaining polarizations of the beams after passing through the plastic-molded scanning lens.
Figure 42:
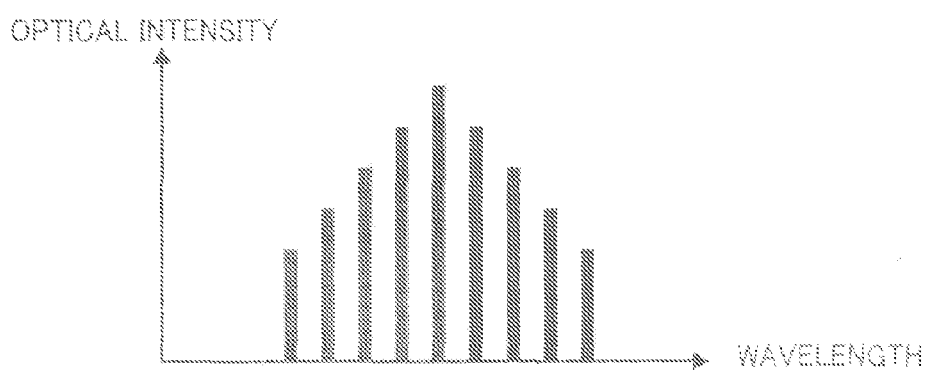
FIG. 42 is a schematic for explaining wavelength properties of light beams output from an edge-emitting semiconductor laser.
Figure 43:
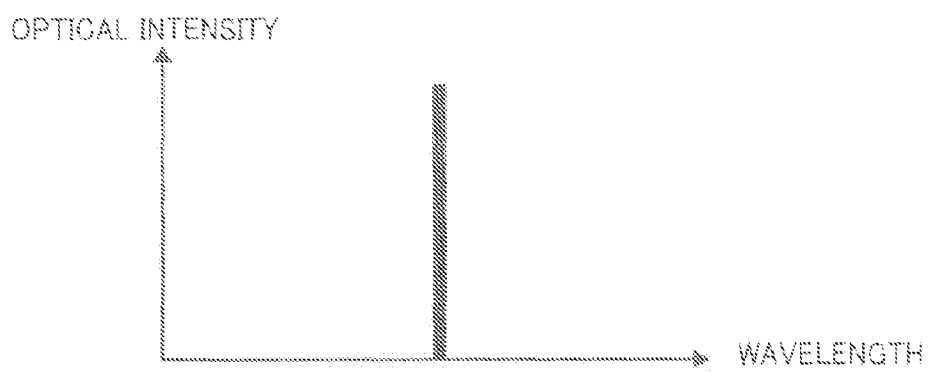
FIG. 43 is a schematic for explaining wavelength properties of light beams output from a surface emitting laser.
Figure 44:
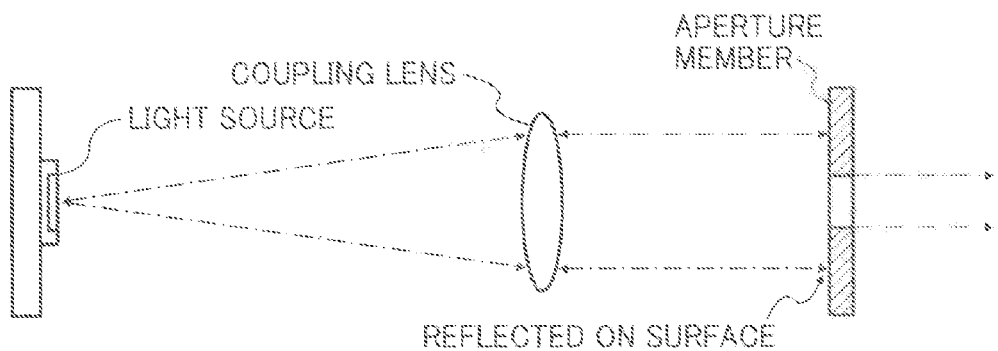
FIG. 44 is a schematic for explaining returning light produced in the optical scanner.
Figure 45:
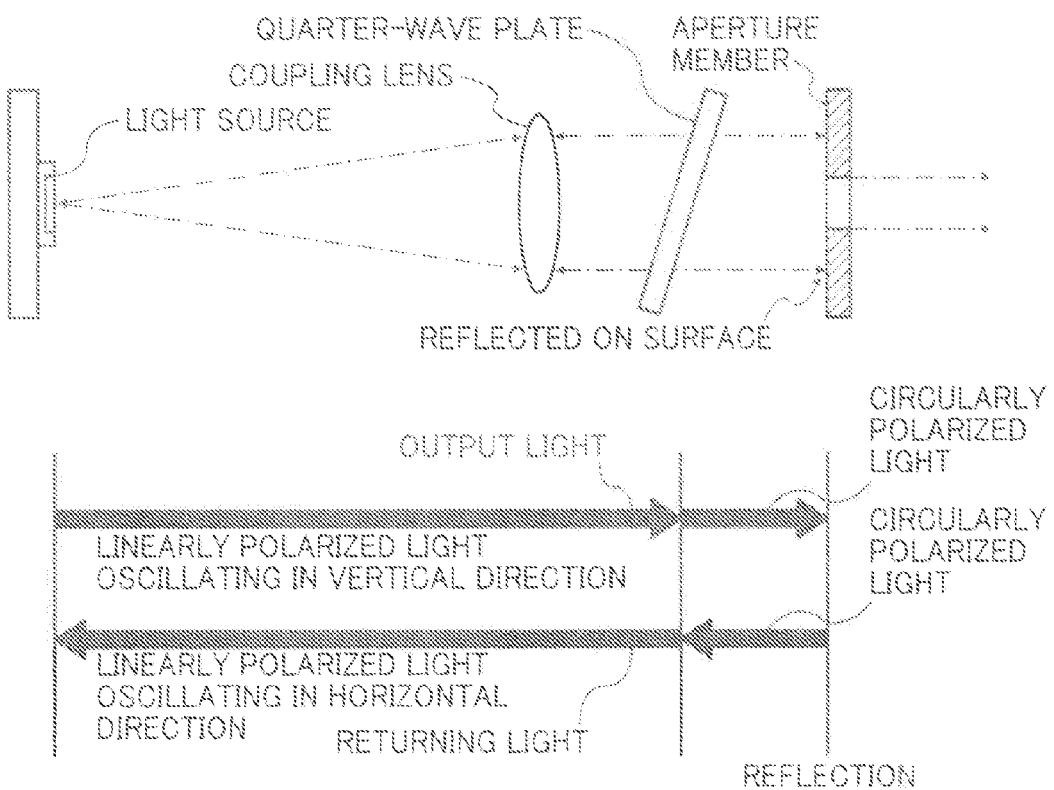
FIG. 45 is a schematic for explaining the effect of a quarter-wave plate given to the returning light.
Figure 46A:
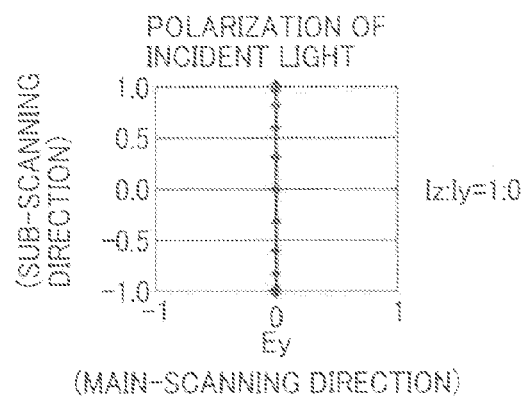
FIGS. 46A and 46B are schematics for explaining the effect of birefringence given to linearly polarized light.
Figure 46B:
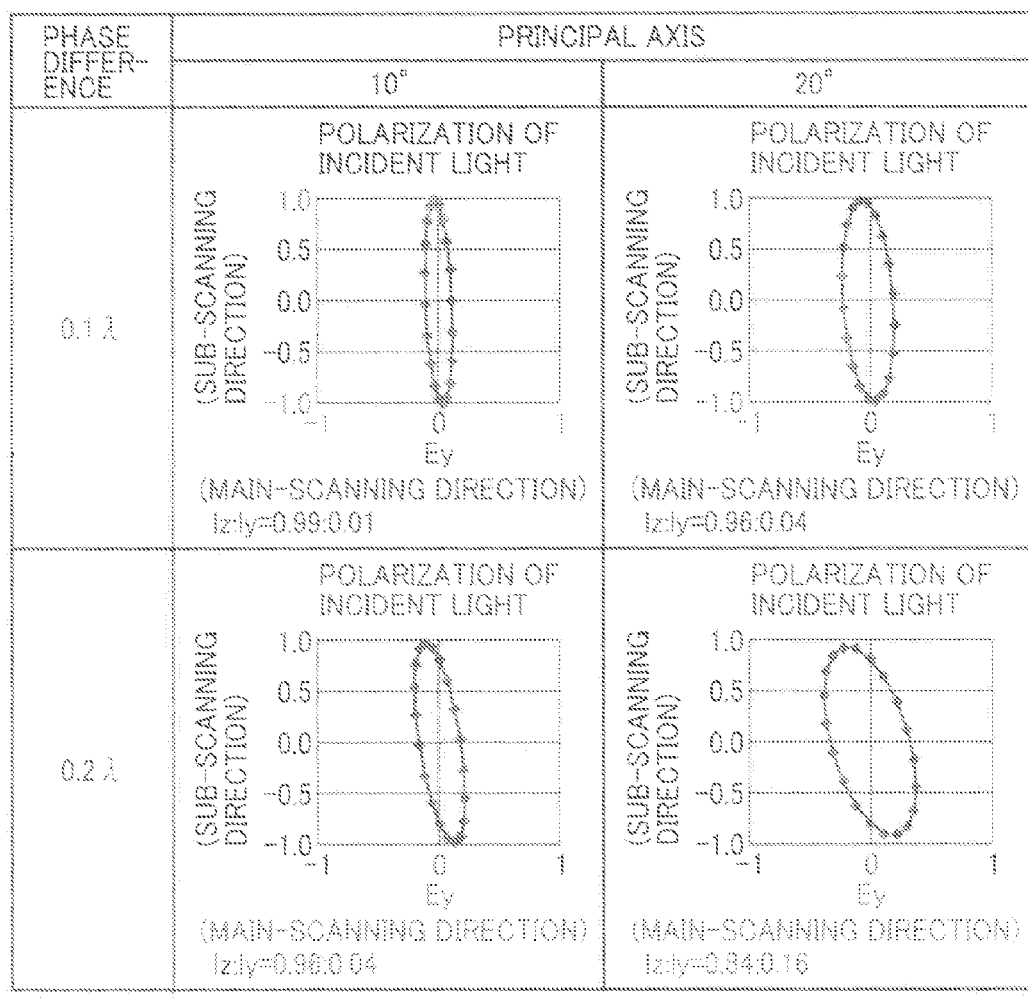
Figure 47A:
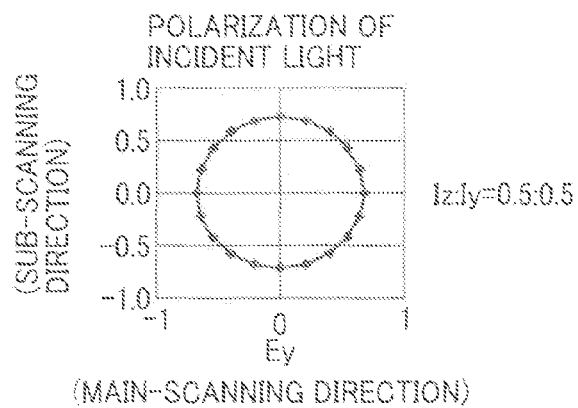
FIGS. 47A and 47B are schematics for explaining the effect of birefringence given to circularly polarized light.
Figure 47B:
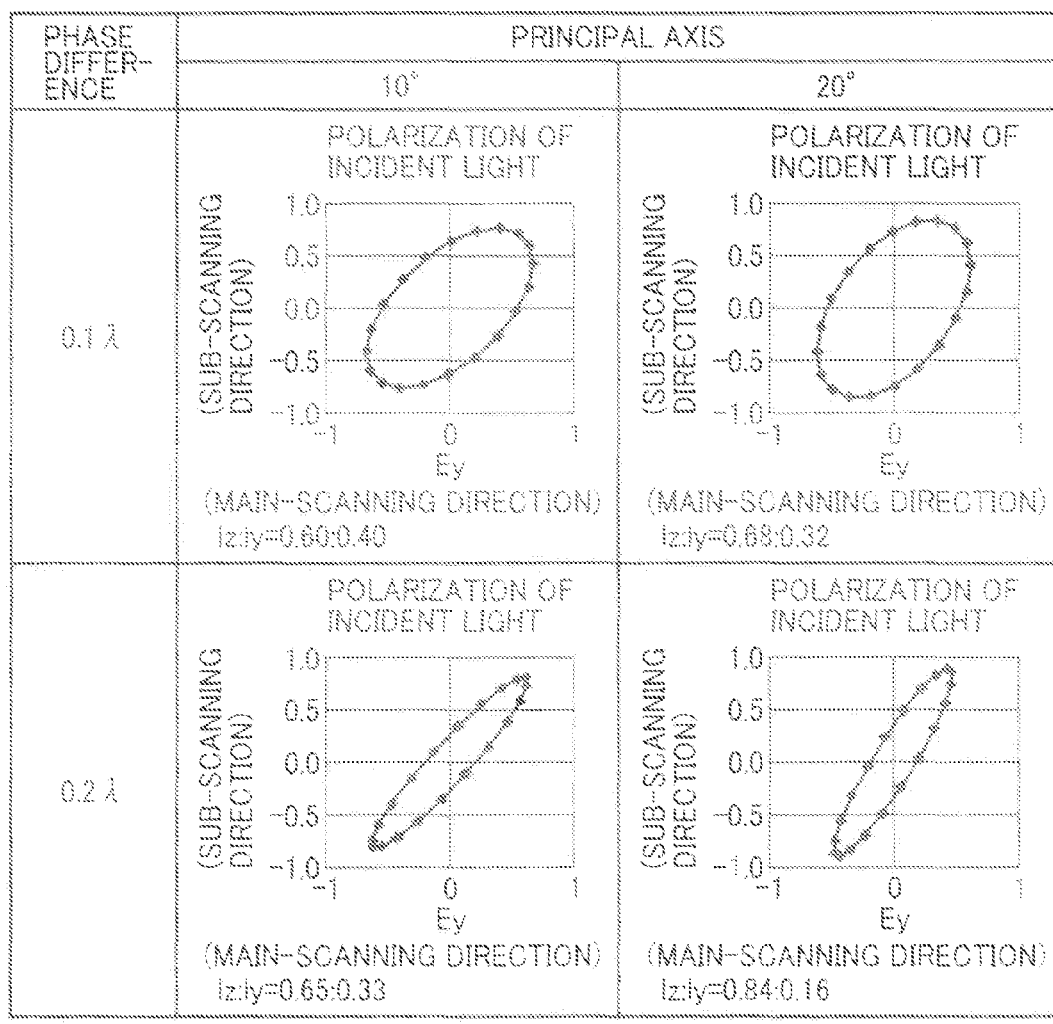

Alternatively, the image forming apparatus may be a color printer 2000 having a plurality of photosensitive elements as illustrated in FIG. 38.

The color printer 2000 is a tandem-type multi-color printer that forms a full-color image by superimposing four colors (black, cyan, magenta, and yellow) over one another, and includes: a photosensitive element K1, a charging unit K2, a developing unit K4, a cleaning unit K5, and a transfer unit K6 for the color black; a photosensitive element C1, a charging unit C2, a developing unit C4, a cleaning unit C5, and a transfer unit C6 for the color cyan; a photosensitive element M1, a charging unit M2, a developing unit M4, a cleaning unit M5, and a transfer unit M6 for the color magenta; a photosensitive element Y1, a charging unit Y2, a developing unit Y4, a cleaning unit Y5, and a transfer unit Y6 for the color yellow; an optical scanner 2010; a transfer belt 2080; and a fixing unit 2030.

Each of the photosensitive elements is rotated in the direction indicated by the arrow in FIG. 38, and the charging units, the developing units, the transfer units, and the cleaning units are arranged around the respective photosensitive elements sequentially in the direction of rotation of the photosensitive elements.

Each of the charging units uniformly charges the surface of the corresponding photosensitive element. The surface of each of the photosensitive elements charged by the charging units is optically scanned by the optical scanner 2010, and a latent image is formed on each of the photosensitive elements.

A toner image is then formed on the surface of each of the photosensitive elements by the corresponding developing unit. The corresponding transfer unit sequentially transfers the toner image of each color onto a recording sheet on the transfer belt 2080, and the fixing unit 2030 finally fixes the image onto the recording sheet.

The optical scanner 2010 has the same configuration as one of the first to the fourteenth exemplary configurations. Therefore, the same advantages as those achieved by the optical scanner 1010 can be achieved.

Therefore, the color printer 2000 can also achieve the same advantages as those achieved by the laser printer 1000.

In the color printer 2000, the optical scanner may be provided for every color, or for every two colors.

The optical scanner according to an aspect of an embodiment of the present invention can scan a target surface with stable light beams by using a multi-beam light source and a plastic-molded scanning lens.

The image forming apparatus according to an aspect of an embodiment of the present invention includes the optical scanner according to one aspect of the invention. Therefore, costs can be reduced without deteriorating image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner comprising:
   a light source including a plurality of light-emitting elements;
   a deflector that deflects a light beam output from the light source; and
   a scanning optical system that condenses the light beam deflected by the deflector onto one target surface, and includes a first optical system composed of at least one resin scanning lens, and a second optical system disposed between the one target surface and one resin scanning lens located nearest to the deflector in the first optical system and including a plurality of optical elements composed of at least either one of a folding mirror(s) and a glass sheet(s), wherein
   m1+g2=m2+g1 is satisfied concerning lengths of optical paths of a first ray and a second ray each included in a light beam being incident on the second optical system and being separated from each other in a rotating shaft direction of the deflector, both the first ray and the second ray being destined to the one target surface, and the lengths of the optical paths being between the deflector and the respective optical elements included in the second optical system on a plane perpendicular to a main-scanning direction, where
   m1 is number of the folding mirror(s) to which the first ray has a shorter optical path than the second ray does,
   m2 is number of the folding mirror(s) to which the first ray has a longer optical path than the second ray does,
   g1 is number of the glass sheet(s) to which the first ray has a shorter optical path than the second ray does, and
   g2 is number of the glass sheet(s) to which the first ray has a longer optical path than the second ray does.

2. The optical scanner according to claim 1, further comprising a quarter-wave plate disposed between the light source and the deflector.

3. The optical scanner according to claim 2, wherein
   an absolute value of $(\Sigma|\theta m1|-\Sigma|\theta m2|)$ is smaller than any one of $|\theta m1|$ and $|\theta m2|$, where
   $\theta m1$ is an inclination angle of a folding mirror to which the first ray has a shorter optical path than the second ray does with reference to a plane perpendicular to a principal ray of a light beam being incident on the second optical system, and
   $\theta m2$ is an inclination angle of a folding minor to which the first ray has a longer optical path than the second ray does with respect to the plane perpendicular to the principal ray of the light beam being incident on the second optical system.

4. The optical scanner according to claim 3, wherein the absolute value of $(\Sigma|\theta m1|-\rho|\theta m2|)$ is a value equal to or less than 15.

5. The optical scanner according to claim 2, wherein
   an absolute value of $(\Sigma|\theta m1|-\Sigma|\theta m2|-2\Sigma|\theta g1|+2\Sigma|\theta g2|)$ is smaller than any one of $|\theta m1|$, $|\theta m2|$, $2|\theta g1|$, and $2|\theta g2|$, where
   $\theta m1$ is an inclination angle of a folding mirror to which the first ray has a shorter optical path than the second ray does with reference to a plane perpendicular to a principal ray of a light beam being incident on the second optical system,
   $\theta m2$ is an inclination angle of a folding mirror to which the first ray has a longer optical path than the second ray does with reference to the plane perpendicular to the principal ray of the light beam being incident on the second optical system,
   $\theta g1$ is an inclination angle of a glass sheet to which the first ray has a shorter optical path than the second ray does with reference to the plane perpendicular to the principal ray of the light beam being incident on the second optical system, and
   $\theta g2$ is an inclination angle of a glass sheet to which the first ray has a longer optical path than the second ray does with reference to the plane perpendicular to the principal ray of the light beam being incident on the second optical system.

6. The optical scanner according to claim 5, wherein the absolute value of $(\Sigma|\theta m1|-\Sigma|\theta m2|-2\Sigma|\theta g1|+2\Sigma|\theta g2|)$ is a value equal to or less than 15.

7. The optical scanner according to claim 2, further comprising:
   a sound insulating member including a first glass portion located on an optical path of light being incident on the deflector and a second glass portion located on an optical path between the deflector and the scanning optical system, wherein
   each of the first glass portion and the second glass portion has a function of a one-eighth-wave plate.

8. The optical scanner according to claim 2, further comprising:
   a sound insulating member including a first glass portion located on an optical path of light being incident on the deflector and a second glass portion located on an optical path between the deflector and the scanning optical system, wherein
   one of the first glass portion and the second glass portion has a function of a quarter-wave plate.

9. An image forming apparatus comprising:
   at least one image carrier; and
   at least one optical scanner according to claim 1 that scans the at least one image carrier with a light beam containing image information.

10. An optical scanner comprising:
    a light source including a plurality of light-emitting elements;
    a deflector that deflects a light beam output from the light source; and
    a scanning optical system that condenses the light beam deflected by the deflector onto one target surface, and includes a first optical system composed of at least one resin scanning lens, and a second optical system disposed between the one target surface and one resin scanning lens located nearest to the deflector in the first optical system and including a plurality of optical elements composed of at least either one of a folding mirror(s) and a glass sheet(s), wherein
    m1+g2<m2+g1 is satisfied concerning lengths of optical paths of a first ray and a second ray each included in a light beam being incident on the second optical system and being separated from each other in a rotating shaft direction of the deflector, both the first ray and the second ray being destined to the one target surface, and the lengths of the optical paths being between the deflector and the respective optical elements included in the second optical system on a plane perpendicular to a main-scanning direction, where
    m1 is number of the folding mirror(s) to which the first ray has a shorter optical path than the second ray does,
    m2 is number of the folding mirror(s) to which the first ray has a longer optical path than the second ray does, g1 is number of the glass sheet(s) to which the first ray has a shorter optical path than the second ray does, and g2 is number of the glass sheet(s) to which the first ray has a longer optical path than the second ray does, and reflectance or transmittance of the light beam being incident on one of the optical elements in the second optical system is different from reflectance or transmittance of the other optical element(s) included in the second optical system.

11. The optical scanner according to claim 10, wherein the second optical system includes a plurality of folding mirrors, one of the optical elements in the second optical system is a folding mirror to which the first ray has a shorter optical path than the second ray does, and a difference between reflectance of a p polarized component and reflectance of an s polarized component on the folding mirror is larger than a difference between reflectance of a p polarized component and reflectance of an s polarized component on the other folding mirror(s) in the second optical system.

12. The optical scanner according to claim 10, wherein the second optical system includes a plurality of folding mirrors and at least one glass sheet, one of the optical elements in the second optical system is a folding mirror to which the first ray has a shorter optical path than the second ray does, and a difference between reflectance of a p polarized component and reflectance of an s polarized component on the folding mirror is larger than a difference between reflectance of a p polarized component and reflectance of an s polarized component on the other folding mirror(s) in the second optical system, and is larger than a difference between transmittance of a p polarized component and transmittance of an s polarized component on the at least one glass sheet.

13. The optical scanner according to claim 10, wherein the second optical system includes at least one folding mirror and at least one glass sheet, one of the optical elements in the second optical system is a glass sheet to which the first ray has a shorter optical path than the second ray does, and a difference between transmittance of a p polarized component and transmittance of an s polarized component on the glass sheet is smaller than a difference between reflectance of a p polarized component and reflectance of an s polarized component on the at least one folding mirror in the second optical system.

14. The optical scanner according to claim 10, wherein the second optical system includes a plurality of folding mirrors, one of the optical elements in the second optical system is a folding mirror to which the first ray has a longer optical path than the second ray does, and a difference between reflectance of a p polarized component and reflectance of an s polarized component on the folding mirror is smaller than a difference between reflectance of a p polarized component and reflectance of an s polarized component on the other folding mirror(s) in the second optical system.

15. The optical scanner according to claim 10, wherein the second optical system includes a plurality of folding mirrors and at least one glass sheet, one of the optical elements in the second optical system is a folding mirror to which the first ray has a longer optical path than the second ray does, and a difference between reflectance of a p polarized component and reflectance of an s polarized component on the folding mirror is smaller than a difference between reflectance of a p polarized component and reflectance of an s polarized component on the other folding mirror(s) in the second optical system, and is smaller than a difference between transmittance of a p polarized component and transmittance of an s polarized component on the at least one glass sheet.

16. The optical scanner according to claim 10, wherein the second optical system includes at least one folding mirror and at least one glass sheet, one of the optical elements in the second optical system is a glass sheet to which the first ray has a longer optical path than the second ray does, and a difference between transmittance of a p polarized component and transmittance of an s polarized component on the glass sheet is larger than a difference between reflectance of a p polarized component and reflectance of an s polarized component on the at least one folding mirror in the second optical system.

17. An image forming apparatus comprising:

at least one image carrier; and at least one optical scanner according to claim 10 that scans the at least one image carrier with a light beam containing image information.

18. An optical scanner comprising:

a light source including a plurality of light-emitting elements;

a deflector that deflects a light beam output from the light source;

a scanning optical system that condenses the light beam deflected by the deflector onto a target surface, and includes a first optical system including at least one resin scanning lens and a second optical system including a plurality of folding mirrors and disposed between a resin scanning lens located nearest to the deflector in the first optical system and the target surface; and a quarter-wave plate disposed between the light source and the deflector, wherein an absolute value of $(\Sigma|\theta m1|-\Sigma|\theta m2|)$ is smaller than any one of $|\theta m1|$ and $|\theta m2|$, concerning lengths of optical paths of a first ray and a second ray each included in a light beam being incident on the second optical system and being separated from each other in a rotating shaft direction of the deflector, the lengths of the optical paths being between the deflector and the respective optical elements included in the second optical system on a plane perpendicular to a main-scanning direction, where $\theta m1$ is an inclination angle of a folding mirror to which the first ray has a shorter optical path than the second ray does with reference to a plane perpendicular to a principal ray of a light beam being incident on the second optical system, and $\theta m2$ is an inclination angle of a folding mirror to which the first ray has a longer optical path than the second ray does with respect to the plane perpendicular to the principal ray of the light beam being incident on the second optical system.

19. The optical scanner according to claim 18, wherein the absolute value of $(\Sigma|\theta m1|-\Sigma|\theta m2|)$ is a value equal to or less than 15.

20. An image forming apparatus comprising:
at least one image carrier; and
at least one optical scanner according to claim 18 that scans the at least one image carrier with a light beam containing image information.

* * * * *